United States Patent [19]

Uchiyama et al.

[11] Patent Number: 5,121,428
[45] Date of Patent: Jun. 9, 1992

[54] SPEAKER VERIFICATION SYSTEM

[75] Inventors: Hiroki Uchiyama; Hiroo Kitagawa, both of Yokohama; Nobuhide Yamazaki, Inagi, all of Japan

[73] Assignee: Ricoh Company, Ltd., Japan

[21] Appl. No.: 610,317

[22] Filed: Nov. 8, 1990

Related U.S. Application Data

[63] Continuation of Ser. No. 297,814, Jan. 17, 1989, abandoned.

[30] Foreign Application Priority Data

| Jan. 20, 1988 | [JP] | Japan | 63-10352 |
| Jan. 20, 1988 | [JP] | Japan | 63-10353 |
| Jan. 20, 1988 | [JP] | Japan | 63-10354 |
| May 2, 1988 | [JP] | Japan | 63-109772 |
| Jul. 25, 1988 | [JP] | Japan | 63-185156 |
| Aug. 31, 1988 | [JP] | Japan | 63-217585 |
| Oct. 20, 1988 | [JP] | Japan | 63-265054 |
| Nov. 8, 1988 | [JP] | Japan | 63-282031 |
| Nov. 14, 1988 | [JP] | Japan | 63-287102 |

[51] Int. Cl.⁵ ............................................. G10L 5/00
[52] U.S. Cl. .................................. 381/42; 381/43; 395/2
[58] Field of Search .................. 381/42, 43; 395/2

[56] References Cited

U.S. PATENT DOCUMENTS 4,336,421 6/1982 Welch et al. ..................... 381/43

FOREIGN PATENT DOCUMENTS 61-278896 12/1986 Japan.
62-254199 11/1987 Japan.

OTHER PUBLICATIONS

"Talker-Recognition Procedure Based on Analysis of Variance", Pruzansky et al, Jul. 8, 1964, pp. 2041-2045 & 2047.
"A Scheme for Speech Processing In Automatic Speaker Verification", Das et al, Mar. 1971, pp. 32-43.
"An Improved Autocorrelation Pitch Detector and Its Evaluation with Chinese", Gao et al, Mar. 1982, pp. 157 & 158.
"Digital Processing of Speech Signals", Rabiner et al, 1987, pp. 150-159.

Primary Examiner—Emanuel S. Kemeny
Attorney, Agent, or Firm—Mason, Fenwick & Lawrence

[57] ABSTRACT

In a speaker verification system, a detecting part detects a speech section of an input speech signal by using a time-series acoustic parameters thereof. A segmentation part calculates individuality information for segmentation by using the time-series acoustic parameters within the speech section, and segments the input speech section into a plurality of blocks based on the individuality information. A feature extracting part extracts features of an unknown speaker for every segmented block by using the time-series acoustic parameters. A distance calculating part calculates a distance between the features of the speaker extracted by the feature extracting part and reference features stored in a memory. A decision part makes a decision as to whether or not the unknown speaker is a real speaker by comparing the calculated distance with a predetermined threshold value. Segmentation is made by calculating a primary moment of the spectrum, over a block, and finding successive values which satisfy a predetermined criterion.

12 Claims, 43 Drawing Sheets

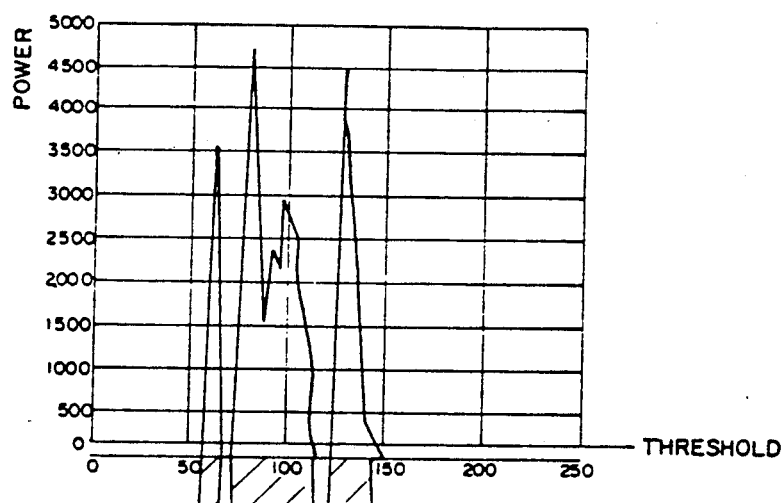
FIG. 3B
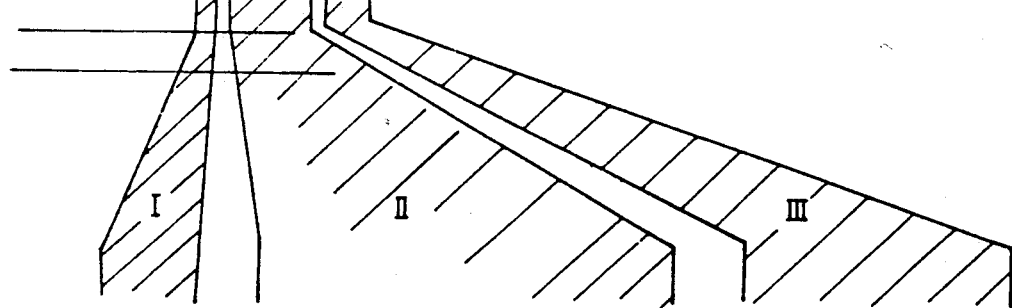
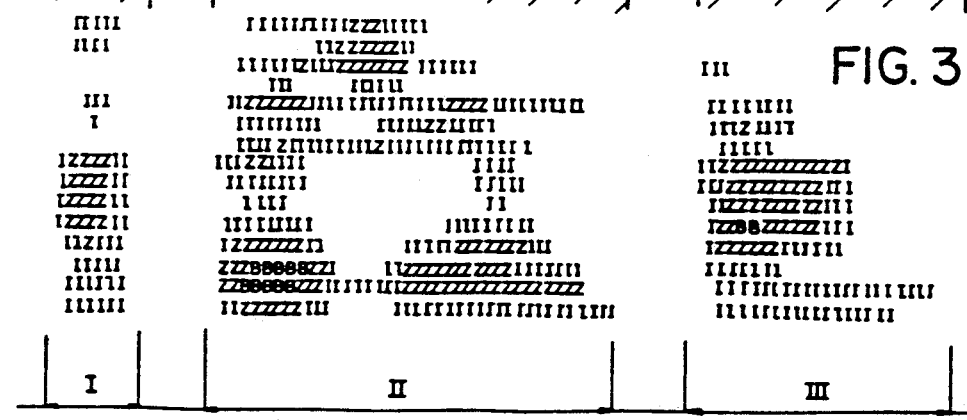
FIG. 3C

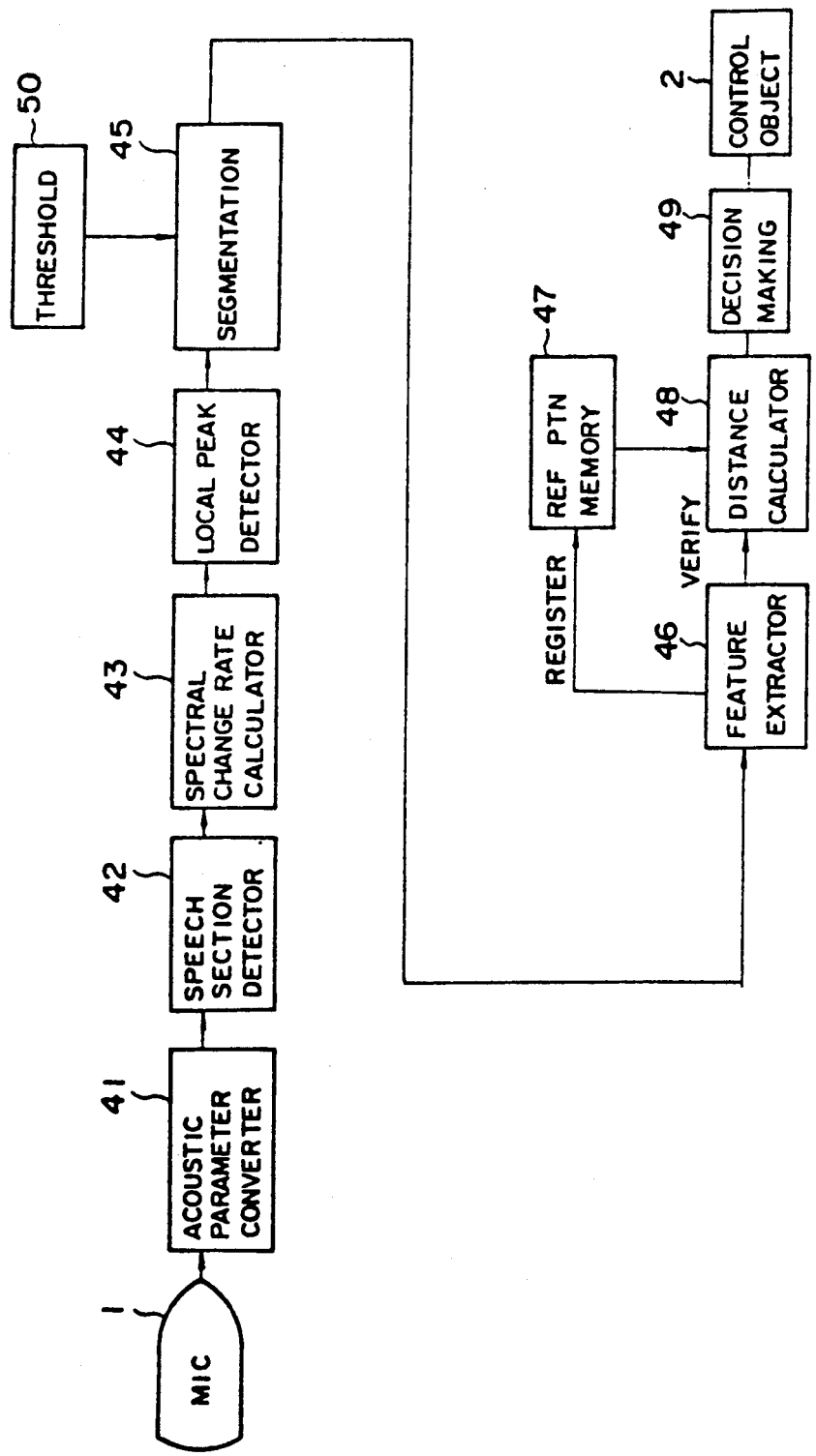

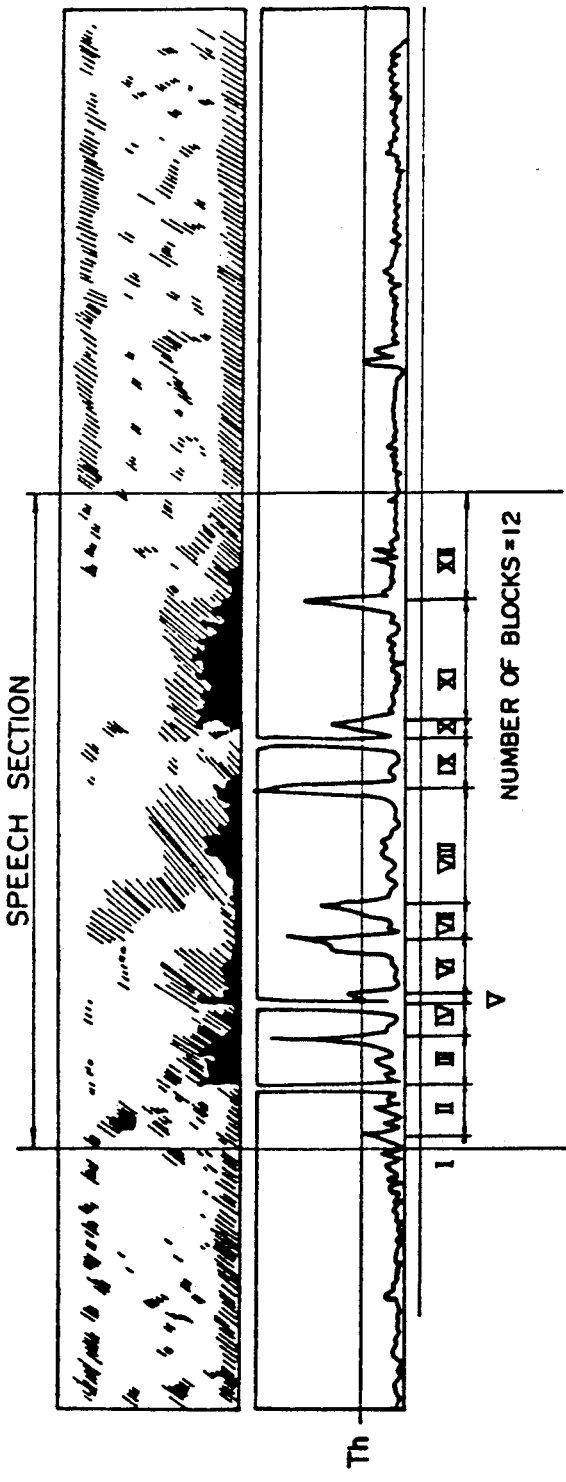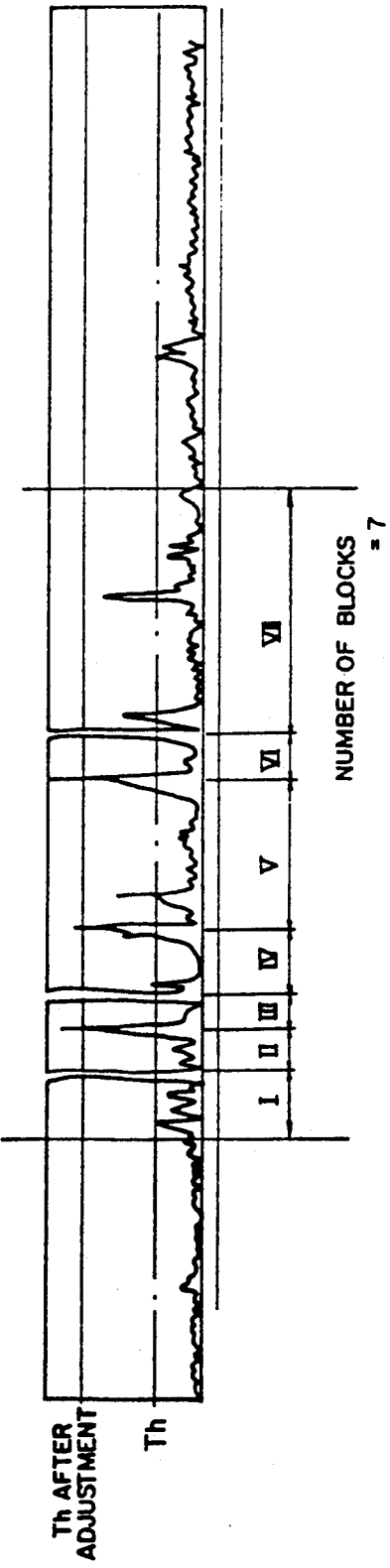

▲ START & END OF SPEECH
△ SEGMENTATION POINT

FIG. 35

| SPECTRUM | PITCH | SCORE |
|---|---|---|
| ○ | ○ | ◎ |
| ○ | × | ○ |
| × | ○ | △ |
| × | × | × |

FIG. 37

| SPECTRUM | PITCH | SCORE |
|---|---|---|
| ◎ | ◎<br>○<br>× | ◎<br>○<br>△ |
| ○ | ◎<br>○<br>× | ◎<br>○<br>× |
| × | ◎<br>○<br>× | ○<br>×<br>× |

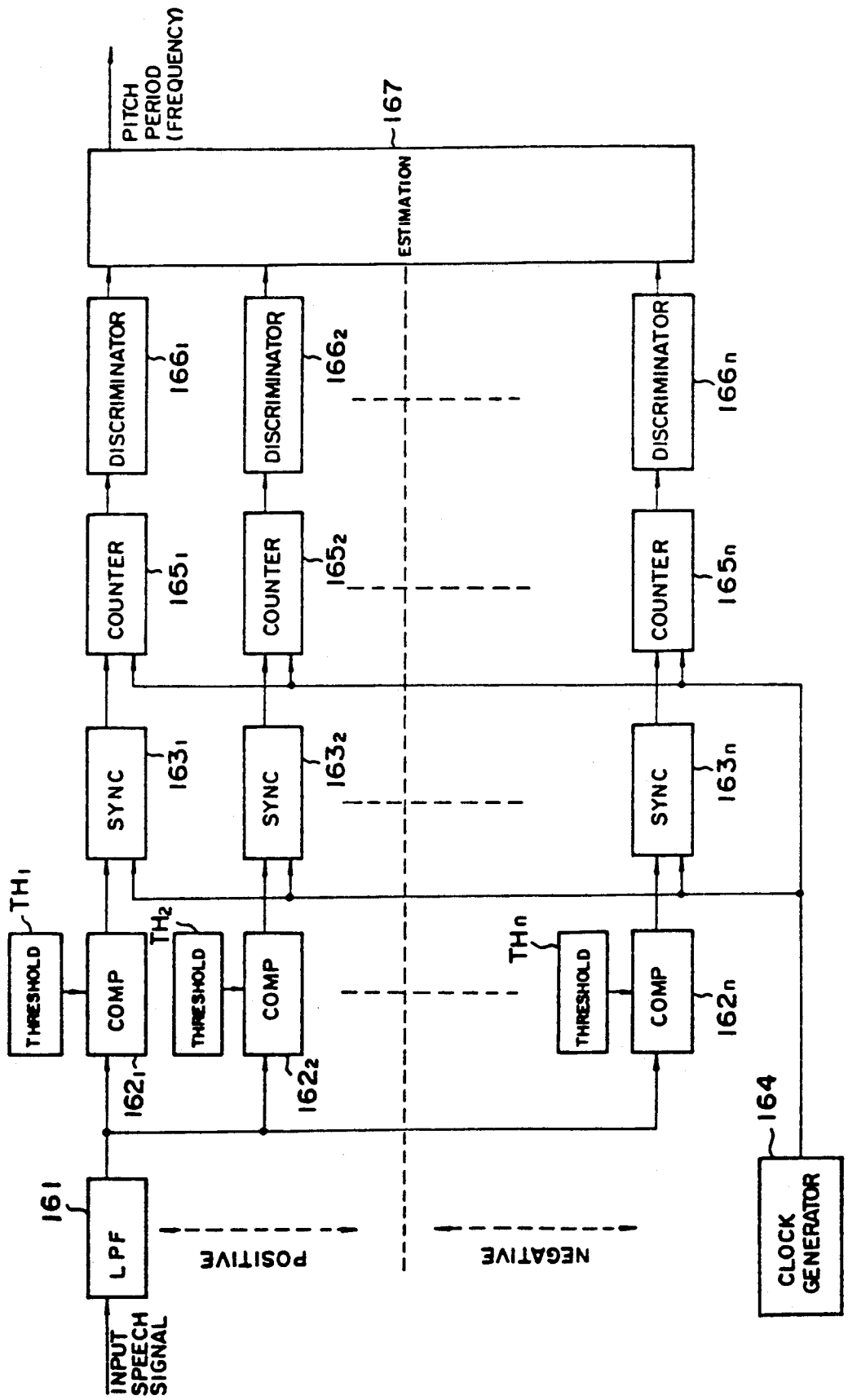

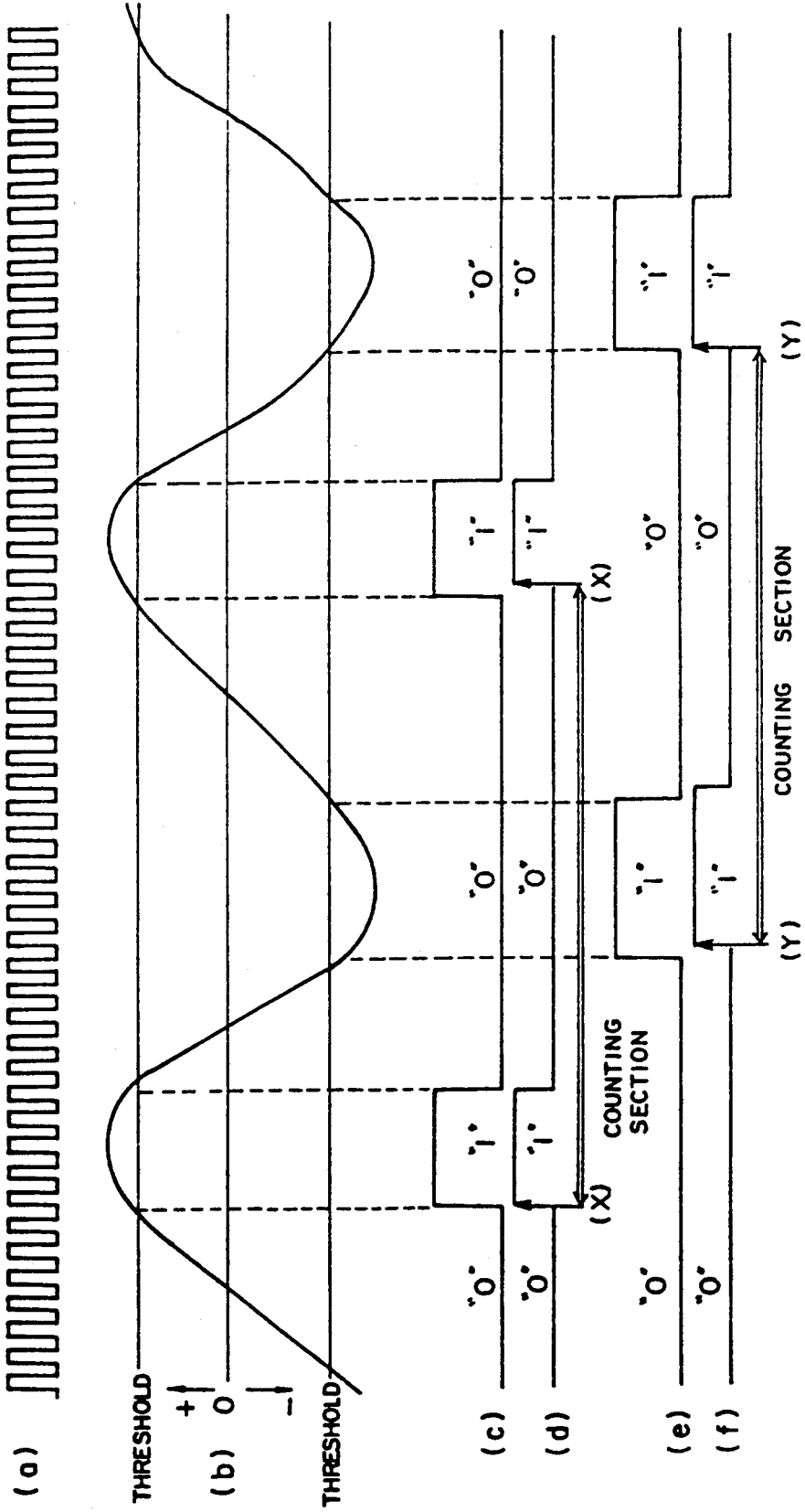

SPEAKER VERIFICATION SYSTEM

This application is a continuation of U.S. Pat. application Ser. No. 07/297,814, filed Jan. 17, 1989, now abandoned.

BACKGROUND OF THE INVENTION

The present invention generally relates to a speaker verification system, and more particularly, to a speaker verification system in which segmentation and feature extraction are performed by extracting speaker-specific information from an input speech signal.

In speaker verification, it is not effective to compare an input speech wave directly with a registered speech wave. Normally, the input speech signal is converted into acoustic parameters such as spectral data and linear predictive coefficients. Other examples of acoustic parameters are pitch frequency, voice energy (power), hormant frequency, PARCOR coefficient, logarithmical cross section ratio, and zero-crossing number.

These acoustic parameters primarily include phonemic information and secondarily includes individuality information. From this viewpoint, it is desired to extract speaker-specific features from acoustic parameters.

Some speaker verification systems designed to extract features having individuality information have been proposed. For example, a Japanese Laid-Open Patent Application No. 61-278896 proposes the use of a filter designed to extract individuality information from an input speech signal. Extracted features are compared with individuality information stored in a dictionary. In the proposed system, it is necessary to employ a filter designed specifically for extracting speaker-specific features, separately from a filter for extracting phonetic information. However, there is a disadvantage in which it is difficult to obtain a sufficient amount of information on speaker-specific features. In addition, there is an increased need for more hardware.

Another proposal is disclosed in the following document: S. K. Das and W. S. Mohn, "A SCHEME FOR SPEECH PROCESSING IN AUTOMATIC SPEAKER VERIFICATION", IEEE Transactions on Audio Electroacoustics, Vol.AU-19, No.1, March 1971, pp.32-43. The document discloses that an input speech is segmented based on a power thereof. However, it is to be noted that segmentation positions are manually determined by visually finding power changes.

SUMMARY OF THE INVENTION

It is therefore a general object of the present invention to provide a speaker verification system in which the aforementioned disadvantages are eliminated.

A more specific object of the present invention is to provide a speaker verification system capable of automatically dividing an input speech signal into a plurality of blocks based on speaker-specific information obtained by subjecting acoustic parameters of the input speech signal to specifically designed algorithms.

A more specific object of the present invention is to provide a speaker verification system capable of extracting features based on speaker-specific information obtained by subjecting acoustic parameters of an input speech signal to specifically designed algorithms.

The above objects of the present invention can be achieved by a speaker verification system including the following structural elements. A converter converts an input speech signal into an acoustic parameter for every frame at predetermined time intervals. A time-series of acoustic parameters forms a multi-dimensional feature vector. A detector detects a speech section of the input speech signal of the time-series acoustic parameters. A segmentation part calculates individuality information for segmentation by using the time-series acoustic parameters within the speech section and segmenting the input speech section into a plurality of blocks based on the individuality information. A feature extractor extracts features of an unknown for every segmented block by using the time-series acoustic parameters. A memory stores reference features of registered speakers for verification. A distance calculator for calculating a distance between the features of the unknown speaker extracted by the feature extractor and the reference features stored in the memory. A decision part makes a decision as to whether or not the unknown speaker is a real speaker by comparing the calculated distance with a predetermined threshold value.

The above objects of the present invention will become apparent from the following detained description when read in conjunction of the accompanying drawings.

BRIEF DESCRIPTION OF THE DRAWINGS

FIGS.3A through 3C are views which illustrate an example of the segmentation procedure of an embodiment of FIG.1;

FIG.8 is a block diagram of a fourth embodiment of the present invention;

FIGS.12A and 12B are views for explaining the segmentation procedure of the fifth embodiment;

FIG.35 is a view showing a score given spectrum-based features and pitch-based features;

FIG.37 is a view showing a score given spectrum-based features and pitch-based features;

FIG.38 is a block diagram of an example of a pitch detector used in the embodiments of the present invention;

FIG.39 shows waveforms of signals at different portions of the embodiment of FIG.38;

DESCRIPTION OF THE PREFERRED EMBODIMENTS

Figure 1:
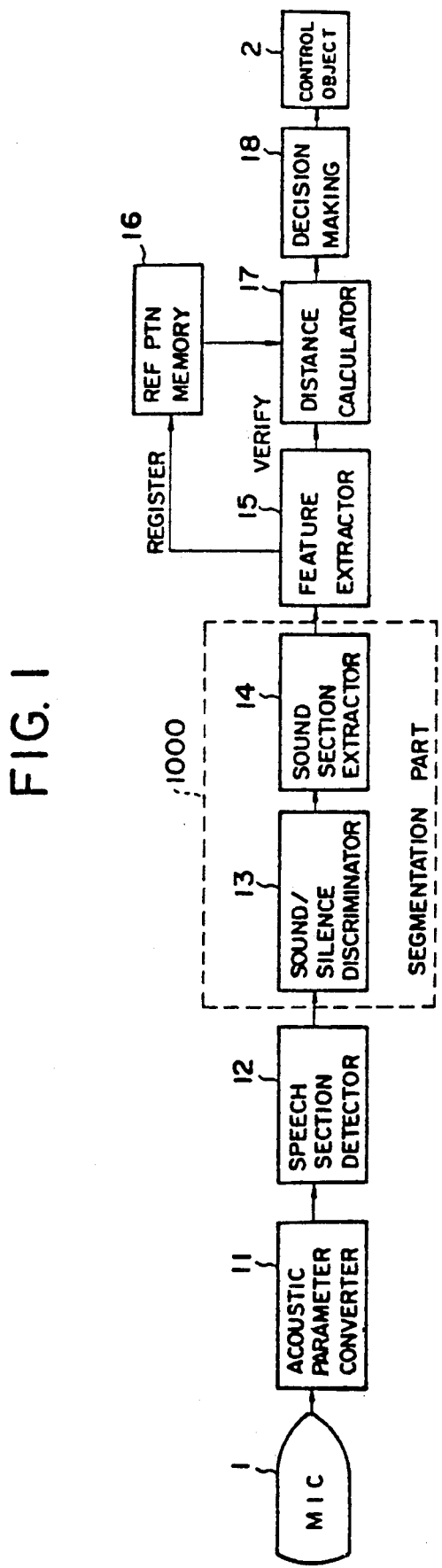
FIG.1 is a block diagram of a first embodiment of the present invention.
Figure 2:
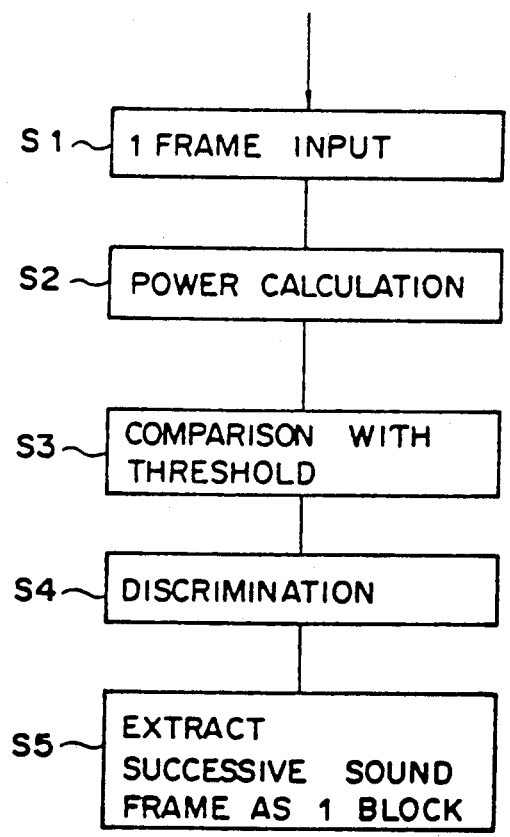
FIG.2 is a flowchart showing a procedure for segmenting an input speech signal into a plurality of blocks according to the first embodiment.

A description is given of a speaker verification system of the first embodiment of the present invention with reference to FIGS.1 and 2.

Referring to FIG.1, the speaker verification system of the first embodiment comprises an acoustic parameter converter 11 connected to a microphone 1, a speech section detector 12, a segmentation part 1000, a feature extractor 15, a reference pattern memory 16, a distance calculator 17, and a decision making part 18. The segmentation part 1000 consists of a sound/silence section discriminator 13 and a voice or sound section extractor 14. The speaker verification system is connected to a control object 2, which is a voice response system or apparatus such as a banking system, a room entrance control system employing a voice activated key, and toys, to name a few.

An input speech signal from the microphone 1 is supplied to the acoustic parameter converter 11, which converts the input speech signal into a time-series of acoustic parameters. For example, the acoustic parameter converter 11 operates as follows. The input speech signal is supplied to a low pass filter (LPF), which cuts off signal components having frequencies equal to or higher than half of the sampling frequency. Next, the output of the low pass filter is quantized to a corresponding discrete signal train by an analog-to-digital converter. Then the discrete signal train is windowed by a Hamming window every predetermined short-term, and is then converted into feature parameters such as a spectrum, cepstrum, PARCOR, pitch and the like. Alternatively, a group of bandpass filters may be used as the acoustic parameter converter 11. The group of bandpass filters produces a time-series of spectral patterns corresponding to the input speech signal. In the following example, the acoustic parameter converter 11 is constructed by 29 bandpass filters which cover the range of center frequencies from 250 to 6300 Hz and which are arranged at every 1/6 octave.

The acoustic parameter converter 11 divides the input speech signal into frames at time intervals of 10 milliseconds, for example. A frame consists of 29 frequency channels and represents a spectrum (spectral pattern). A spectrum $f_{ij}$ at time i is described by a multi-dimensional vector as follows:

$$f_{ij} = (f_{i1}, f_{i2}, \ldots, f_{i29}) \qquad (1)$$

(j = 1, 2, 3, ..., 29).

In this manner, the acoustic parameter converter 11 produces a time-series of spectral patterns $f(\{f_1, f_2, \ldots, f_{29}\})$.

The speech section detector 12 detects a speech section by using the time-series spectral patterns supplied from the acoustic parameter converter 11. The segmentation part 1000 segments the speech section into a plurality of blocks or segments by the time-series spectral patterns $f_{ij}$. One block corresponds to a sound section.

FIG.2 shows a procedure for segmenting the input speech section into blocks by using the power of the input speech signal. Referring to FIG.2, one frame is supplied to the sound/silence discriminating part 13 (step S1). The power of the frame at time i is calculated by using the following formula (step 2):

$$Pw_i = \sum_{j=1}^{29} f_{ij} \qquad (2)$$

The calculated power of the frame is compared with a predetermined threshold value by the sound section extractor 14 (step S3). Then a decision is made as to whether the frame represents a sound or silence (step S4). Then successive frames of sounds are extracted as one block (step S5).

Figure 3A:
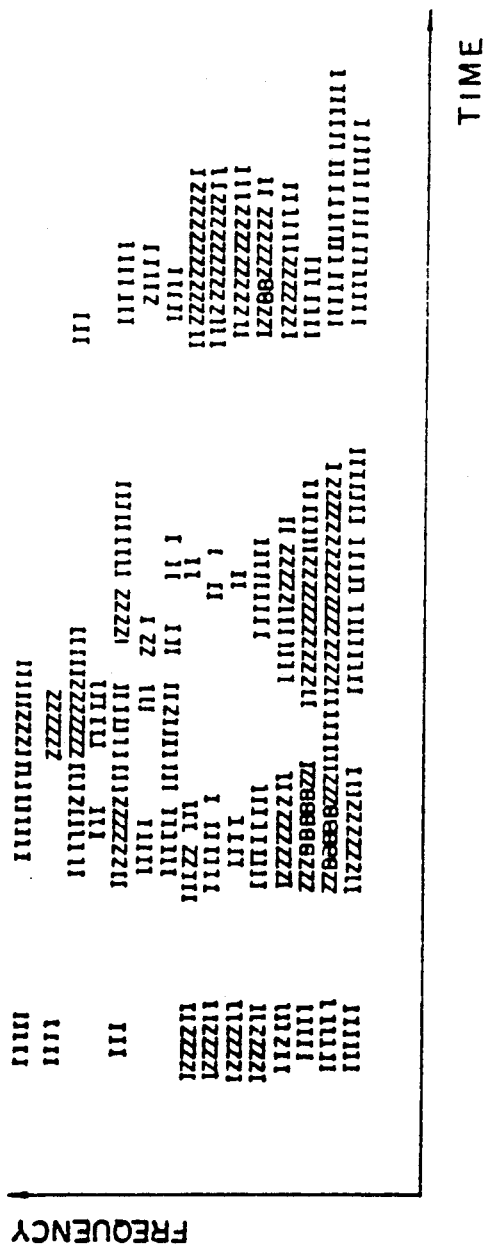

FIGS.3A and 3B show an example of the segmentation by the segmentation part 1000. FIG.3A shows a time-spectrum pattern of an utterance of a word. FIG.3B shows the relationship between the time variation of the power of the spectral patterns of FIG.3A and the aforementioned threshold value. For the threshold value shown in FIG.3B, the speech section is segmented into three blocks of sounds I, II and III. FIG.3C shows positions of the blocks I, II and III on the time-spectrum pattern.

The feature extractor 15 extracts features of the input speech signal for every block. In the embodiment, features are described by an arithmetical average of the time-series spectral data values over each of the blocks. It is now assumed that a spectral train contained in the k-th block is represented by:

$$f_{kij} = (f_{ki},f_{ki2},\ldots,f_{ki29}) \quad (3)$$

where k denotes the k-th block, i denotes time in the k-th block, and j denotes the channel number of the aforementioned bandpass filters. In this case, a feature of the k-th block, Xkavr is written by a multi-dimensional feature vector as follows:

$$X_{kavr} = (1/m) \times \sum_{i=1}^{m} f_{kij} \quad (4)$$
$$= [f_{k1},f_{k2},\ldots,f_{k29}]$$

where m denotes the number of all the frames contained in the k-th block, and $f_{kj}$ (j = 1, 2, ..., 29) denotes the arithmetical average of frame powers over the k-th block calculated for every channel. Therefore, Xkavr denotes an average spectrum of the k-th block. An additional feature parameter may be added to the feature Xkavr defined by formula (4). For example, an additional feature parameter may be obtained by generating a least square fit line in which the feature Xkavr is considered as one spectrum, and then calculating a gradient of the least square fit line.

Turning to FIG.1, at the time of registering, as reference features, features extracted by the feature extractor 15 into the reference pattern memory 16, the features are registered together with a file name assigned to a speaker. On the other hand, at the time of speaker verification, the features are supplied to the distance calculator 17, which calculates, for every block, the distance between the features of the input speech and the registered speech patterns. Then the distance calculator 17 calculates a weighted average of the calculated distance values over all the blocks. The distance may be Euclidean distance or Maharanobis' distance. Further the known F ratio [=(variance of speaker means)/(average within speaker variance)] may be employed for the purpose of dimensionality reduction of the number of feature parameters.

The decision making part 18 makes a decision of speaker verification by comparing the distance value calculated by the distance calculator 17 with a predetermined threshold value provided for each speaker. Then, the control object 2 is controlled by the discrimination result supplied from the decision making part 18.

Figure 4:
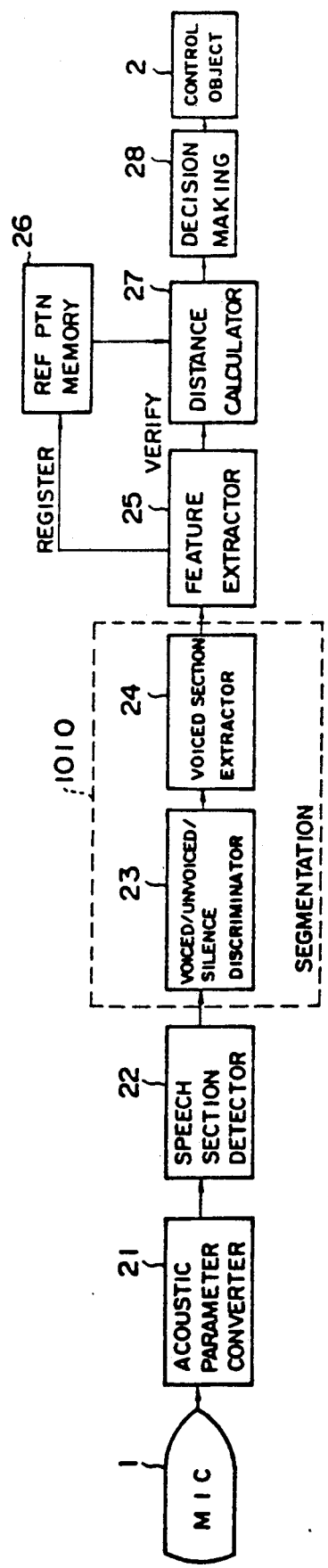
FIG.4 is a block diagram of a second embodiment of the present invention.

A description is given of the second embodiment of the present invention with reference to FIG.4. An acoustic parameter converter 21 and a speech section detector 22 are the same as the corresponding parts shown in FIG.1. A segmentation part 1010 consists of a discrimination part 23 and a voiced section extractor 24. The discrimination part 23 discriminates a voiced sound within the speech section from an unvoiced sound and silence therein for every frame. This is done by using the power of each frame, the rate of spectral change (time function), or pitch information obtained for every frame. Then the voiced section extractor 24 extracts only successive voiced frames as one voiced section, which corresponds to one block. A feature extractor 25, a reference pattern memory 26, a distance calculator 27 and a discrimination part 28 are the same as the corresponding parts shown in FIG.1.

Figure 5:
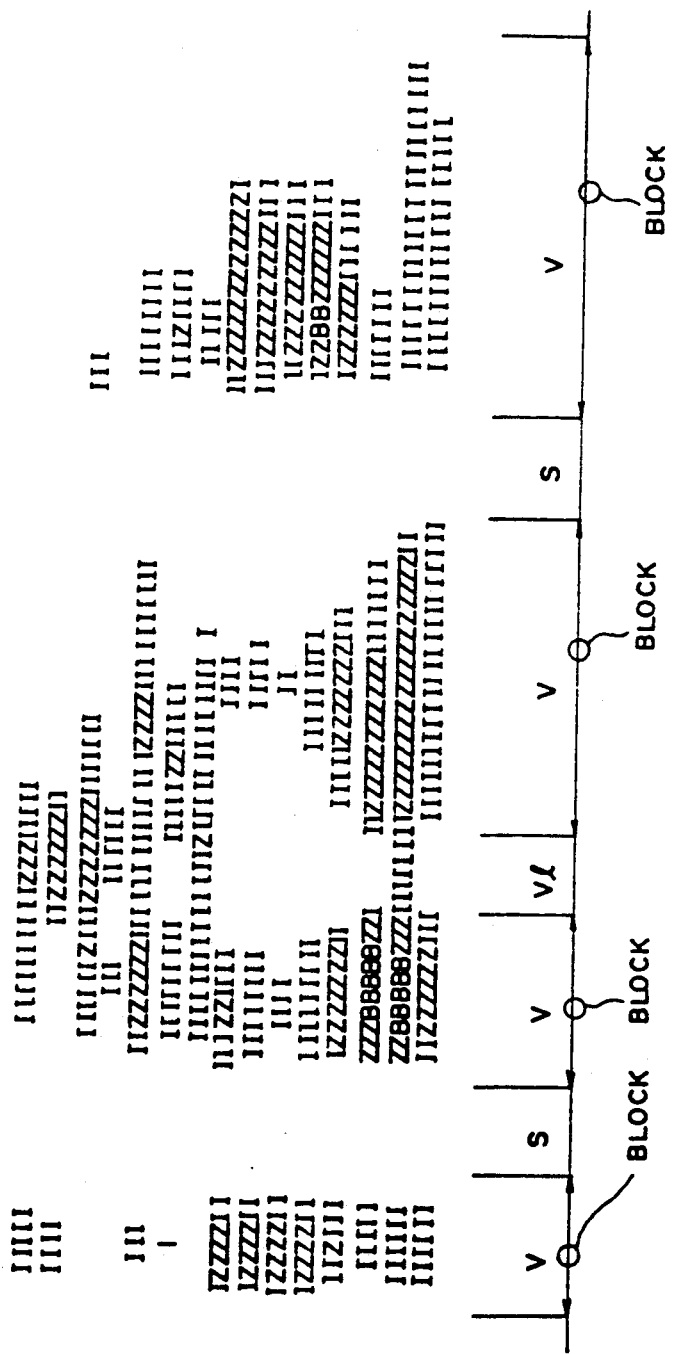
FIG.5 is a time-spectrum pattern for explaining the segmentation of the second embodiment.

FIG.5 shows a time-spectrum pattern, which is segmented into voiced sections V, unvoiced sections V1, and silence sections S. Each of the voiced sections V is served as one block.

Figure 6:
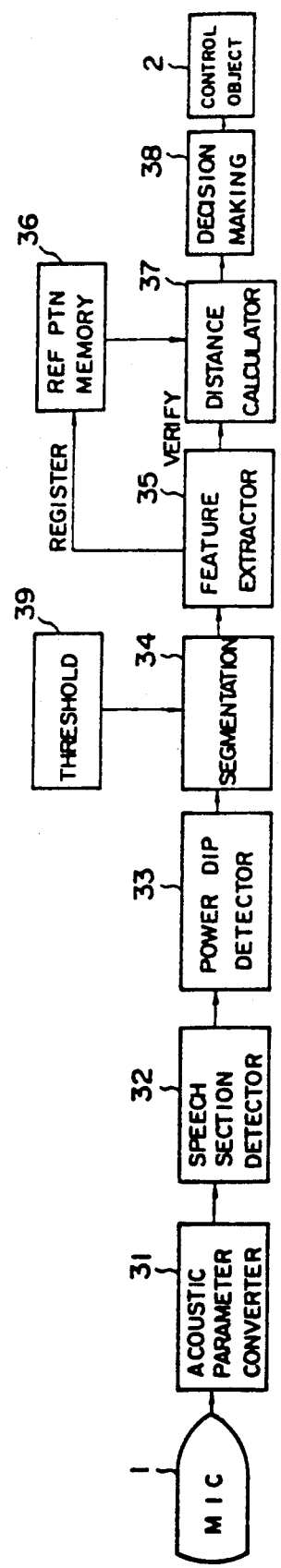
FIG.6 is a block diagram of a the third embodiment of the present invention.

A description is given of the third embodiment of the present invention with reference to FIG.6. In FIG.6, all of the parts except for a power dip detector 33, a segmentation part 34 and a threshold setting part 39 are the same as the corresponding parts of the first and second embodiments. The segmentation of the embodiment of FIG.6 is performed by detecting a dip in power of an input speech signal by a power dip detector 33. The power of the input speech signal is compared with a predetermined threshold power by the segmentation part 34. When a bottom peak in a time function of power variations has a power smaller than the threshold power, the input speech section is segmented at a position of the bottom peak. In this manner, the entire speech section is segmented into a plurality of blocks. The above-mentioned comparison is performed by the segmentation part 34.

Figure 7A:
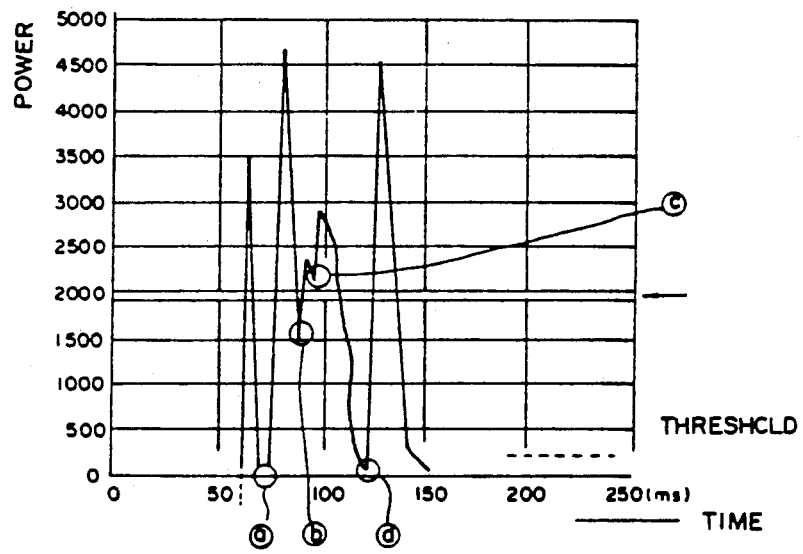
FIGS.7A and 7B are views which illustrate the segmentation of the third embodiment.
Figure 7B:
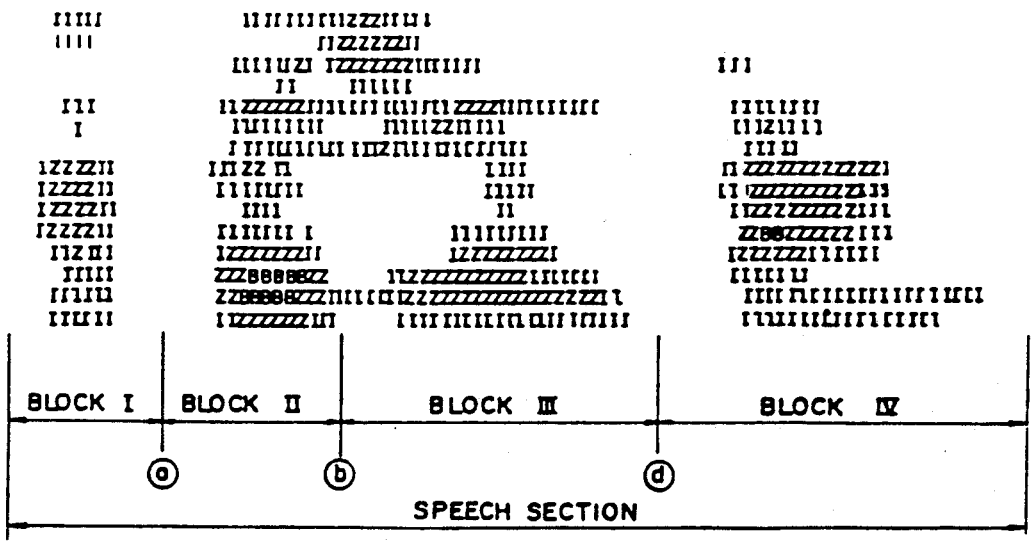

FIG.7A is a graph of the power of an input speech signal as a function of time, and FIG.7B shows ⓐ corresponding time-spectrum pattern. An illustrated time variation of power has four bottom peaks ⓐ, ⓑ, ⓒ, and ⓓ. The bottom peak c has the power greater than the threshold power, and the other bottom peaks ⓐ, ⓑ and ⓓ have powers smaller than the threshold power. Therefore, the input speech section is segmented at positions of the bottom peaks ⓐ, ⓑ and ⓓ. As a result, the input speech section is segmented into four blocks I through IV.

A description is given of the fourth embodiment of the present invention with reference to FIG.8. The embodiment of FIG.8 has the following essential feature with regard to the segmentation procedure. A rate of spectral change as a function of time is calculated. Next, local peaks in the time-varying spectral change are detected. Then each local peak is compared with a predetermined threshold level. When the local peak exceeds the threshold level, the speech section is segmented at a position of the above local peak. In this manner, the entire speech section is segmented into a plurality of blocks. All of the parts of FIG.8 except for a spectral change rate calculator 43, a local peak extractor 44, a segmentation part 45 and a threshold setting part 50, are the same as the corresponding parts shown in FIG.6. The spectral change rate calculator 43 calculates the rate of spectral change of the input speech signal. This is done by calculating the difference between adjacent spectral data. The local peak detector 44 detects local peaks in the rate of spectral change as a function of time. Local peaks can be detected by calculating the difference between values of the rate of spectral change at adjacent times. The segmentation part 45 compares the detected local peaks with a predetermined threshold level stored in the threshold setting part 50. Then the segmentation part 45 segments the entire speech section at positioned of local peaks higher than the threshold level. Then each of the segmented sections is served as a block.

Figure 9:
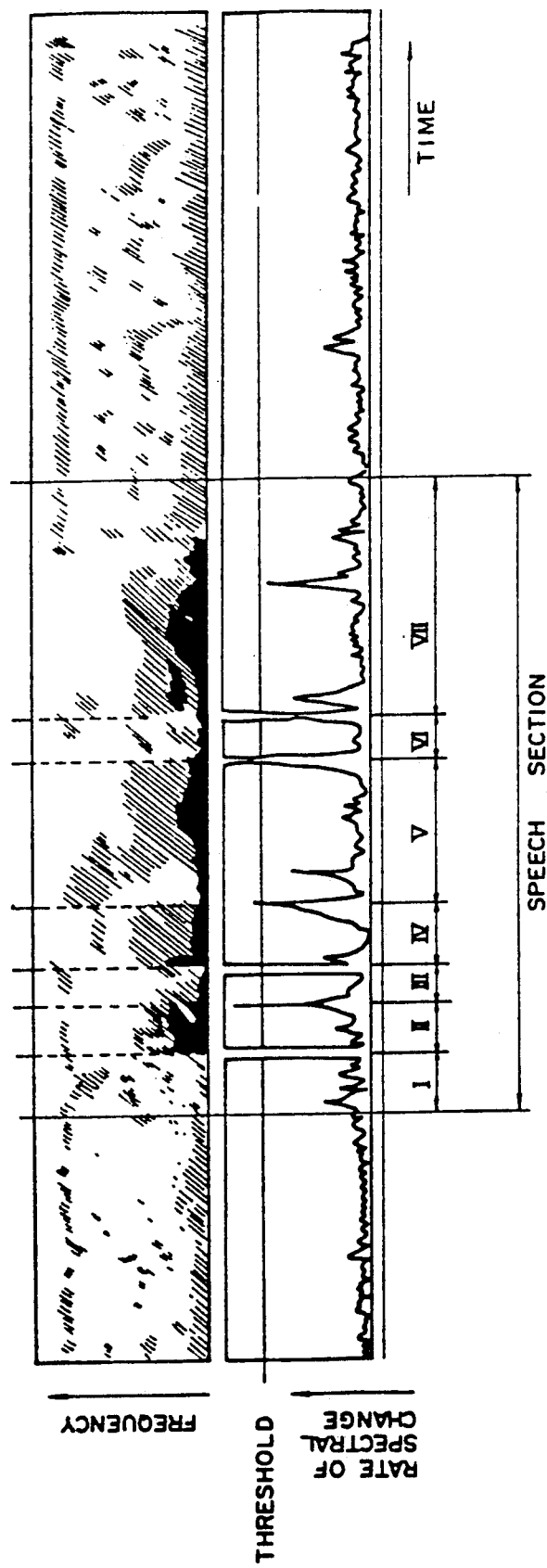
FIG.9 shows a spectrogram and a corresponding time function of the rate of spectral change for explaining the segmentation of the fourth embodiment.

FIG.9 shows a spectrogram of an utterance, and a time variation of the rate of spectral change. As shown, innumerable local peaks appear in time variations of the rate of spectral variations. For a threshold value as shown in FIG.9, six local peaks are detected. Therefore, the speech section is segmented into seven blocks I through VII at the positions of six local peaks.

Figure 10:
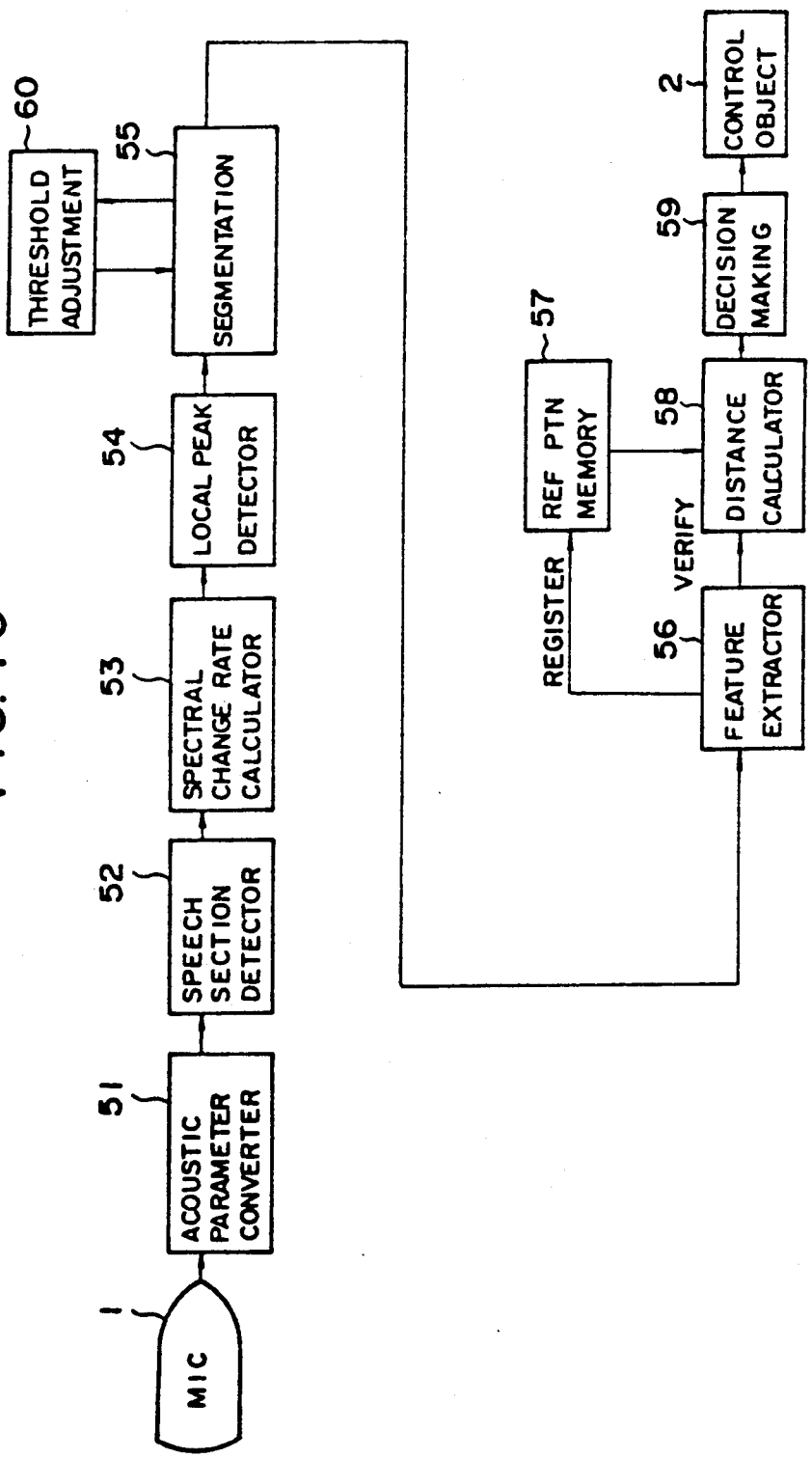
FIG.10 is a block diagram of a the fifth embodiment of the present invention.

A description is given of the fifth embodiment of the present invention with reference to FIG.10. The embodiment of FIG.10 has an essential feature in which the number of blocks to be obtained by the segmentation is predetermined, and the threshold value is variably adjusted so that the speech section is segmented into the predetermined number of blocks. This is achieved by a segmentation part 55 and a threshold adjustment part 60. It is noted that in cases when the threshold value is not appropriate, it is impossible to segment the speech section into an appropriate number of blocks. For example, if the threshold value is too small, the speech section is segmented into too many blocks. As a result, the verification rate decreases. In FIG.10, all of the parts except for the segmentation part 55 and the threshold adjustment part 60 are the same as the corresponding parts shown in FIG.8.

Figure 11:
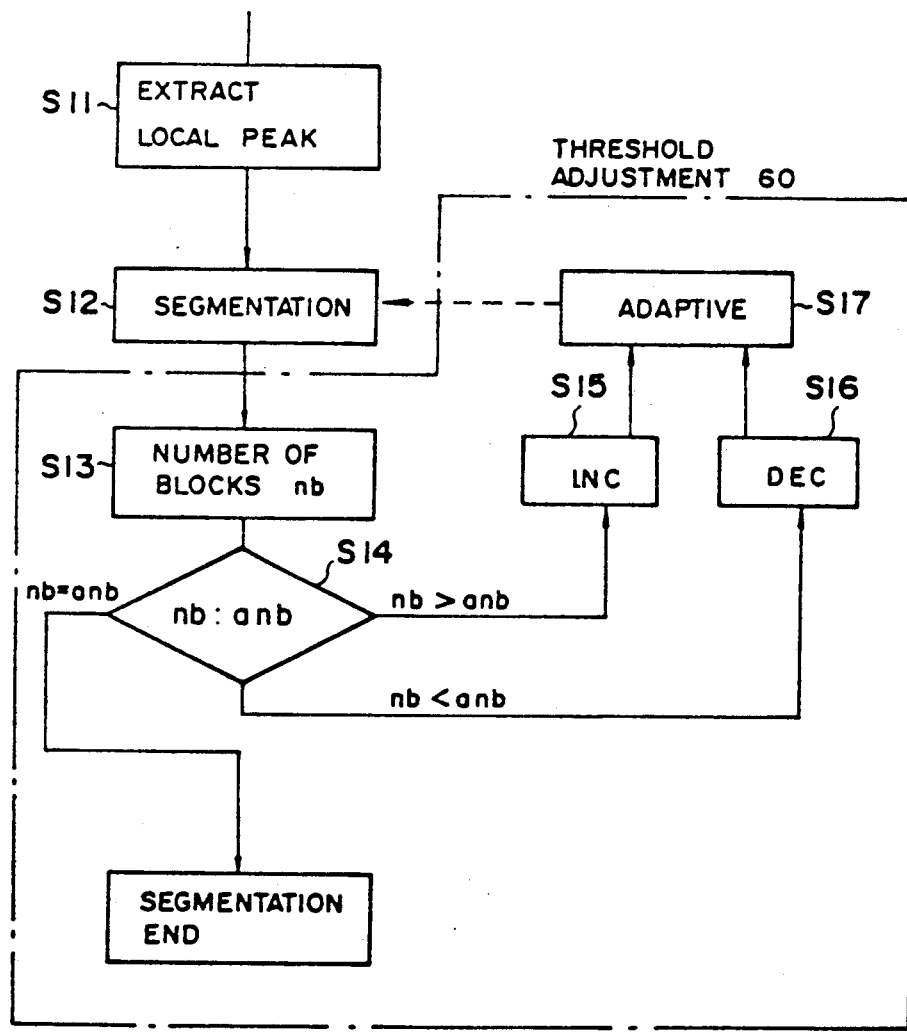
FIG.11 is a flowchart showing the segmentation procedure of the fifth embodiment.

FIG.11 is a flowchart of the procedure implemented by the segmentation part 55 and the threshold adjustment part 60. It is now assumed that the number of segmented blocks set in the threshold adjustment part 60, is equal to 7 (anb=7). The segmentation part 55 segments the speech section by comparing the detected local peaks in the time function of the rate of spectral change with the predetermined threshold value Th (step S12). Then in step S14 of FIG.11, the segmentation part 55 determines whether or not the number of segmented blocks (nb) obtained in step S12 is equal to or larger than the predetermined number of blocks (anb=7). If the number of segmented blocks nb is larger than the predetermined number of blocks (anb), the segmentation part 55 instructs the threshold adjustment part 60 to increase the threshold value Th (step S15). On the other hand, if the number of segmented blocks nb is smaller than the predetermined number of blocks, the segmentation part 55 instructs the threshold adjustment part 60 to decrease the threshold value Th (step S16). In this manner, a sequence consisting of steps S12 through S17 is repetitively carried out until an appropriate threshold value Th is obtained. That is, when the number of segmented blocks nb becomes equal to the threshold value Th, the segmentation operation is terminated.

FIGS.12A and 12B show an example of the above-mentioned segmentation in which the threshold value Th is variably adjusted. The threshold value is initially set as shown in FIG.12A. For this threshold value Th, 12 blocks I through XII are obtained. According to the embodiment of FIG.10, the threshold value Th is adjusted so as to segment the input speech section into 7 blocks I through VII as shown in FIG.12B.

In the fifth embodiment, information on dips in power of the input speech signal may be used in place of the rate of spectral change. In this case, the threshold value is adjusted in such a manner that when the segmented blocks are more than the predetermined number of blocks, the threshold value is made small. On the other hand, if the number of segmented blocks is smaller than the predetermined number of blocks, the threshold value is made large.

Figure 13:
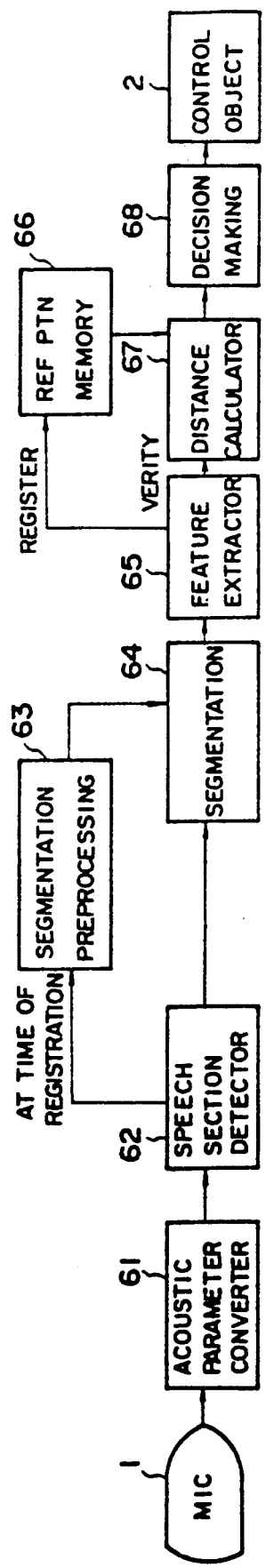
FIG.13 is a block diagram of a sixth embodiment of the present invention.

A description is given of the sixth embodiment of the present invention with reference to FIG.13. In the aforementioned embodiments, the speech section is segmented into a plurality of blocks based on the frame power of the input speech signal, dips in the time-varying power thereof, or the rate of spectral change thereof. Therefore, there may be fluctuations in segmentation positions due to variations in power in different utterances of the same word.

From the above-mentioned viewpoint, according to the sixth embodiment, at the time of registering reference patterns, the following processing is carried out as a preprocessing. That is, a speech section of an input speech signal is segmented into a plurality of blocks. This is done on the basis of the power of the input speech signal, dips in power thereof, or the rate of spectral change. Blocks thus obtained are used as reference blocks at the time of speaker verification. At this time, a speech section of an input speech signal to be verified is segmented into a plurality of blocks by making pattern matching with the reference blocks. By using the above-mentioned preprocessing, it becomes possible to obtain almost the same segmentation positions for different utterances of the same word.

Referring to FIG.13, an input speech signal from the microphone 1 is supplied to an acoustic parameter converter 61, which converts the input speech signal into acoustic parameters for every frame. A speech section detector 62 detects a speech section by using the time-series acoustic parameters. These processings may be the same as the corresponding processings in the previous embodiments.

At the time of registering the reference blocks as the preprocessing, a segmentation preprocessing part 63 segments a speech section of an input speech signal into a plurality of blocks. The segmented blocks are registered in the segmentation preprocessing part 63, and are served as reference blocks for the spoken word. The segmentation procedure implemented by the segmentation preprocessing part 63 may be the same as one of the aforementioned procedures. At the time of speaker verification, a segmentation part 64 segments a speech section of an input speech signal to be verified into a plurality of blocks by performing pattern matching between the input speech signal within the speech section and the reference blocks. In this pattern matching, the segmentation part 64 calculates a power of the input speech signal every frame, and performs the pattern matching between the power of each frame and the reference blocks.

A feature extractor 65 extracts features of the input speech for every block. In the embodiment of FIG.13, features are extracted for every block by averaging the spectral patterns over each block in the direction of the time-axis, as described previously.

At the time of registering features related to the utterance of a word by a speaker, the features extracted for every frame by the feature extractor 65 are registered in a reference pattern memory 66 together with a file name assigned the speaker. The registered features are served as reference features of the word spoken by the speaker. On the other hand, at the time of speaker verification, a distance calculator 67 calculates the distance between features of an unknown speaker and the registered speakers for all corresponding blocks thereof. Then, the distance calculator 67 calculates the weighted mean of the calculated distance values over all the blocks.

A decision making part 68 makes a decision as to whether or not the unknown speaker is a real speaker by comparing the calculated distance with a predetermined threshold value. Then, the decision making part 68 controls the control object 2.

The detail of the segmentation preprocessing part 63 and the segmentation part 64 is now described with reference to FIG.14. The segmentation preprocessing commences to segment a speech section of an utterance used for the purpose of registering reference blocks at segmentation positions obtained by calculating the power of the input speech signal for every frame, dips in the time-varying power thereof, or the rate of spectral change thereof (steps S21, S22 and S23). Hereinafter, the above-mentioned utterance is referred to as a first utterance. Then the segmentation part 64 performs pattern matching based on the conventional dynamic programming between the first utterance served as the reference pattern and an utterance to be verified (steps S31, 32). Hereinafter, the above utterance to be verified is referred to as a second utterance. By the dynamic programming matching, frame positions of the second utterance corresponding to the segmentation positions of the first utterance are obtained (step S33). Then the second utterance is segmented at the obtained framed positions. Similarly, the following utterances may be processed.

Figure 15:
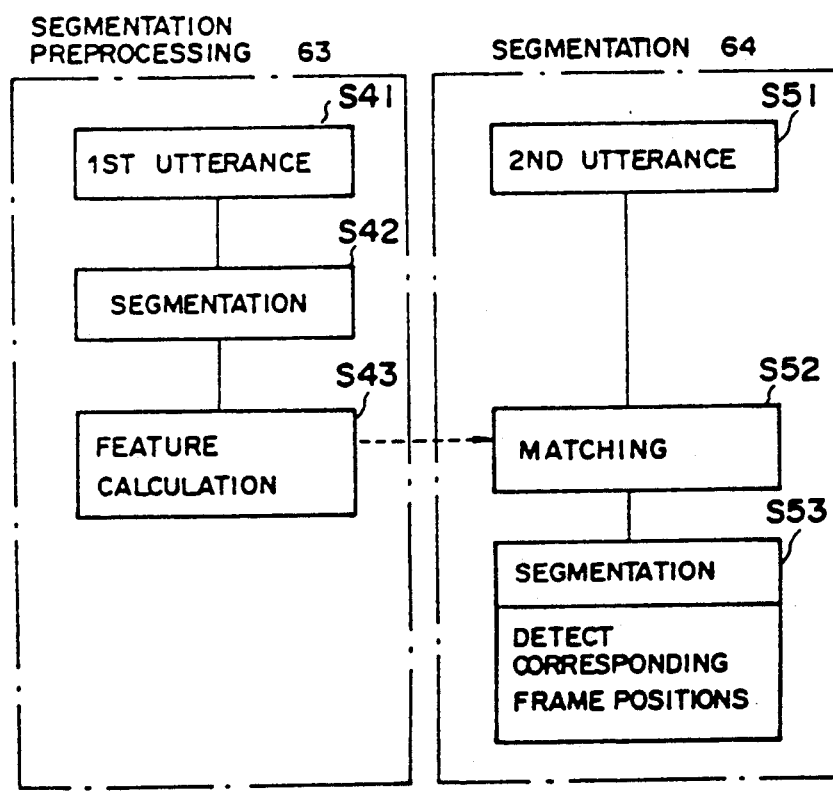
FIG.15 is a block diagram which illustrates another structure of each of the segmentation preprocessing part 63 and the segmentation part 64 of the sixth embodiment.

FIG.15 shows another example of the processing implemented by the segmentation preprocessing part 63 and the segmentation part 64. The segmentation preprocessing part 63 segments the first utterance into blocks by calculating the power of the input speech signal, dips in the time-varying power thereof, or the rate of spectral change as a function of time thereof (steps S41 and 42). Then features of the input speech signal are extracted for every block by calculating the arithmetical average of values of the acoustic parameter over each block in the direction of the time-axis (step 43). Then the segmentation part 64 performs pattern matching between the features of first utterance and the features of the second utterance. This pattern matching may be performed by using the conventional duration time length control type state transition model (step S52). This is described in the U.S. Pat. application Ser. No. 213,826, the disclosure of which is hereby incorporated by reference. By the pattern matching, frame positions of the second utterance corresponding to the reference blocks are obtainable. Then the second utterance is segmented into blocks at the detected frame positions (S53).

Figure 16:
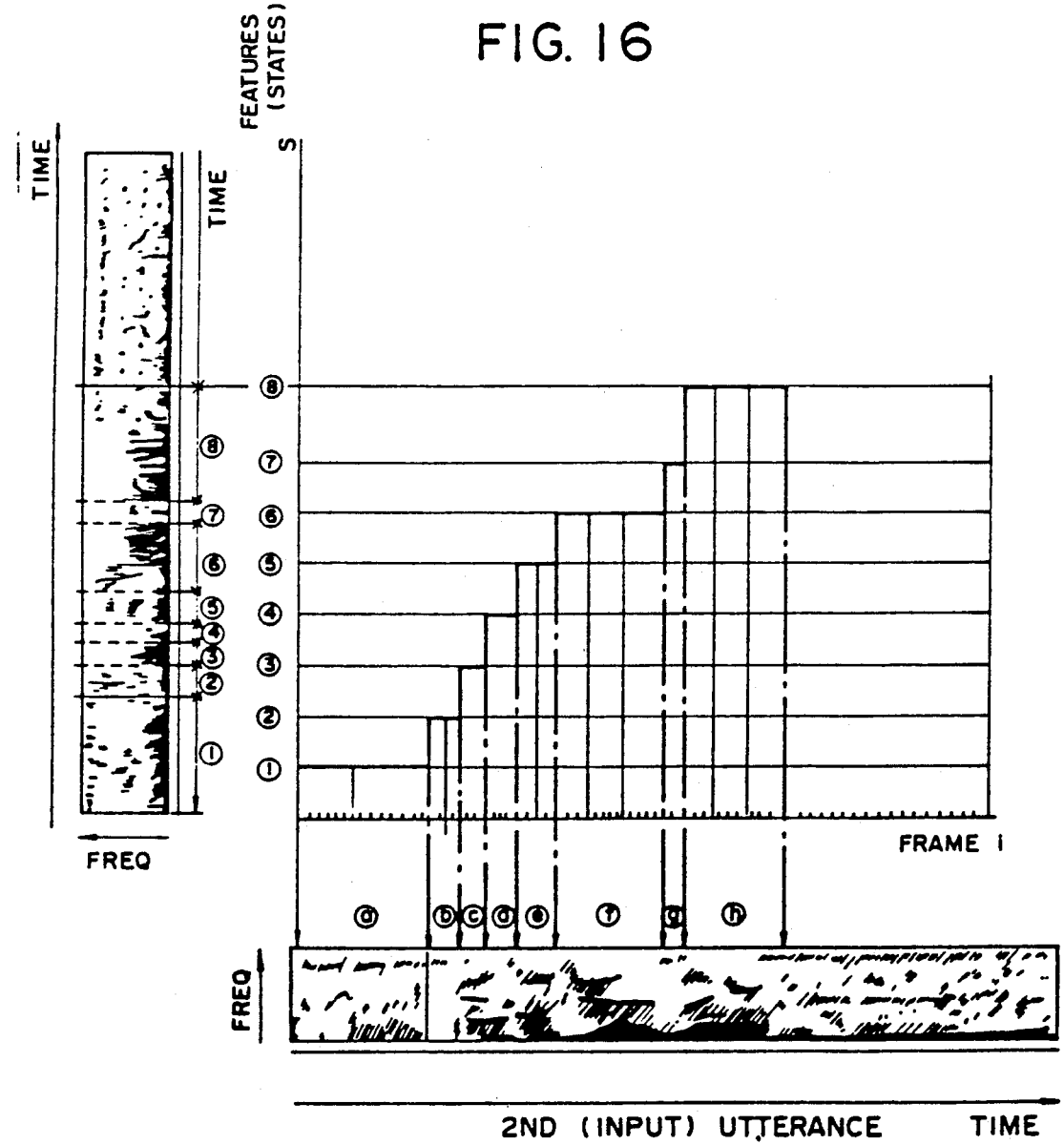
FIG.16 is a view showing the segmentation procedure implemented by the structure of FIG.15.

Referring to FIG.16, a spectrogram of the first utterance (reference utterance) is shown along the vertical axis taken for the feature quantities (states) of the first utterance, and a spectrogram of the second utterance is shown along the horizontal axis taken for frames of the second utterance to be verified. Numerals ①  through ⑧ denote different features (states) related to eight blocks within the speech section of the first utterance. As can be seen from FIG.16, the number of lattice points can be greatly reduced, compared with a case where the pattern matching is performed every frame.

Alphabets ⓐ and ⓗ denote feature quantities of eighth blocks within the input speech section of the second utterance. The eight blocks in the second utterance are obtained by performing pattern matching between each frame of the second utterance and the features of the first utterance, starting from a feature value ①. The pattern matching using the duration time interval control type state transition model consists of the following three steps.

Step 1: $D(1,1) = d(1,1)$
Step 2: for $2 \leq i \leq I$ $$D(i,1) = D(i-1,1) + d(i,1)$$

for $2 \leq s \leq N$ $$D(i,s) = d(i,s) + \min \begin{cases} D(i-1, s-1) + W \\ D(i-1, s) \end{cases}$$

Step 3: (accumulated distance between the reference pattern and the input speech) = $D(I,N)$, where i is the input frame number, s is the state number, d(i,s) denotes the distance between i-th frame of the second utterance and the j-th state of the first utterance, D(i,s) denotes the accumulated distance of an optimum path which reaches a lattice point (i,s), and W denotes a weighting factor. Also, "min" denotes a separation for selecting smaller one of the accumulated distance $[D(i-1,s-1)+W]$ and $D(i-1,s)$.

Figure 17:
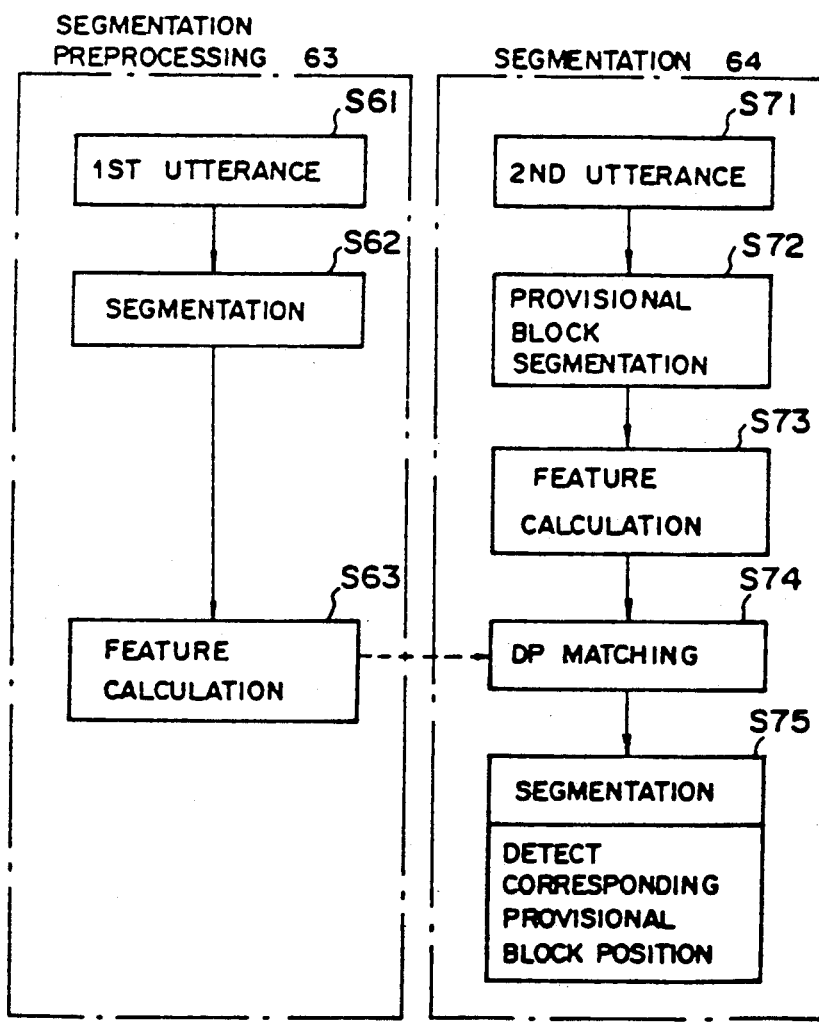
FIG.17 is a block diagram which illustrates yet another structure of each of the segmentation preprocessing part 63 and the segmentation part 64 of the sixth embodiment.

FIG.17 shows yet another example of the processing implemented by the segmentation preprocessing part 63 and the segmentation part 64. The segmentation preprocessing part 63 segments the first utterance into blocks by calculating the power of the input speech signal, dips in the time-varying power thereof, or the rate of spectral change thereof (steps S61 and S62). Then the segmentation preprocessing part 63 extracts features of the input speech signal used for obtaining reference blocks for every block. This can be done by arithmetically averaging values of the acoustic parameter over each block in the direction of the time-axis (step S63). The segmentation part 64 segments the second utterance into provisional blocks by using the power of the second utterance, dips in the time-varying power thereof, or the rate of spectral change thereof (steps S71 and S72). The number of provisional blocks in the second utterance is set more than that of blocks in the first utterance. Then the segmentation part 64 extracts features for every provisional block of the second utterance by arithmetically averaging values of the parameters over each block in the direction of the time-axis (step S73). Then the segmentation part 64 performs the dynamic programming matching between the features obtained for each block of the second utterance and features extracted for every provisional block of the first utterance (step S74). In is noted that in the previous embodiments, the pattern matching is carried out by comparing each frame of the second utterance with the features of the first utterance. On the other hand, in the embodiment of FIG.17, the pattern matching is performed by comparing the second utterance with the first utterance per block unit. As a result, it is possible to obtain a decreased amount of distance calculations for the pattern matching. By using the above-mentioned pattern matching per block, the provisional blocks of the second utterance are grouped so as to correspond to the respective reference blocks of the first utterance. Then the segmentation part 64 segments the second block into blocks so as to coincide with the respective provisional block groups.

Figure 18:
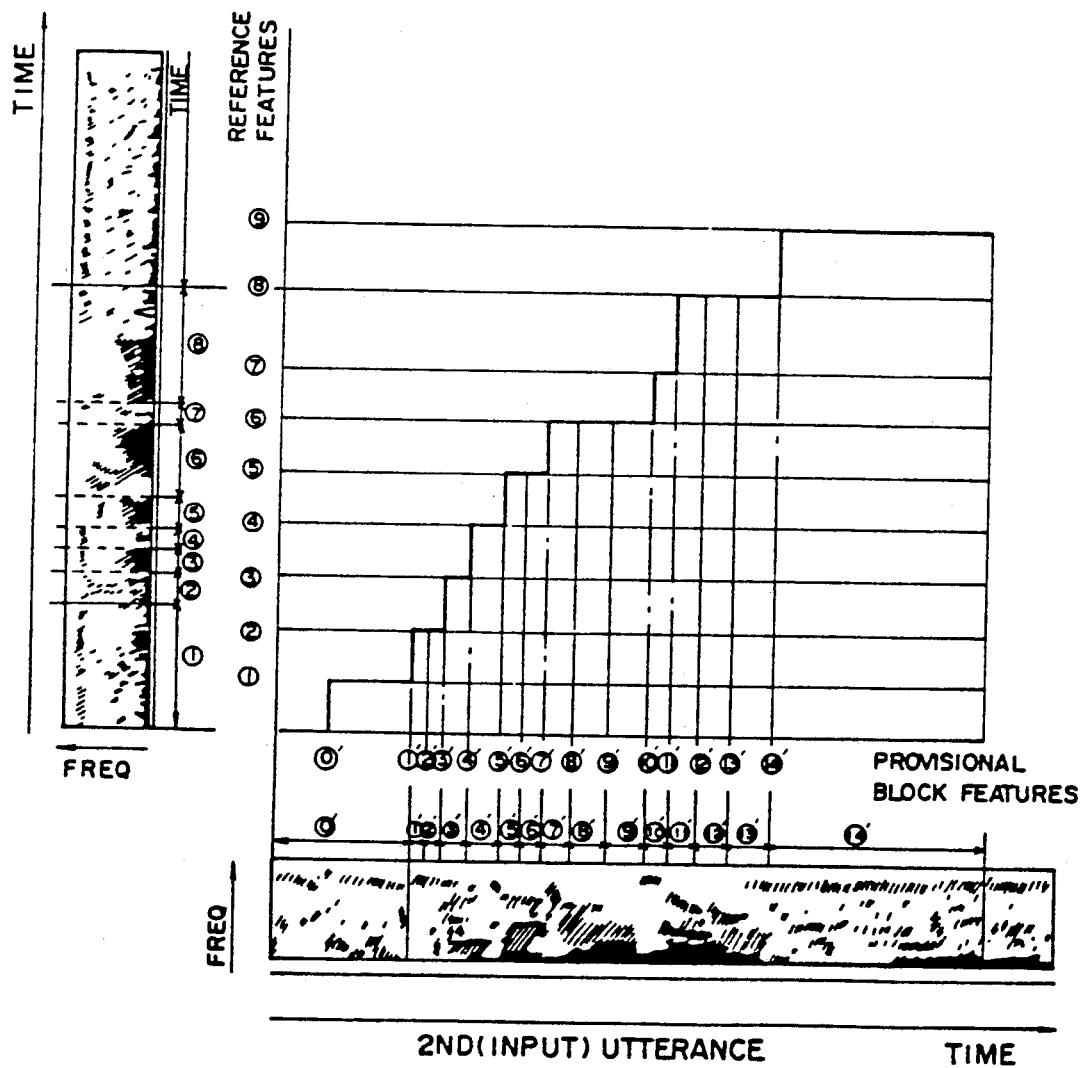
FIG.18 is a view showing the segmentation procedure implemented by the structure of FIG.17.

FIG.18 shows an example of the processing of FIG.17. A spectrogram of the first utterance is arranged along the vertical axis, and a spectrogram of the second utterance is arranged along the horizontal axis. The first utterance is segmented into 9 blocks. Numerals ① to ⑨ denote features related to the corresponding blocks of the first utterance. The second utterance is segmented into 14 provisional blocks obtained by the aforementioned dynamic programming matching. Numerals ①' to denote features related to the corresponding blocks of the second utterance. For example, provisional blocks ①' and ②' of the second utterance are segmented as one block corresponding to the block ① of the first utterance.

Figure 19:
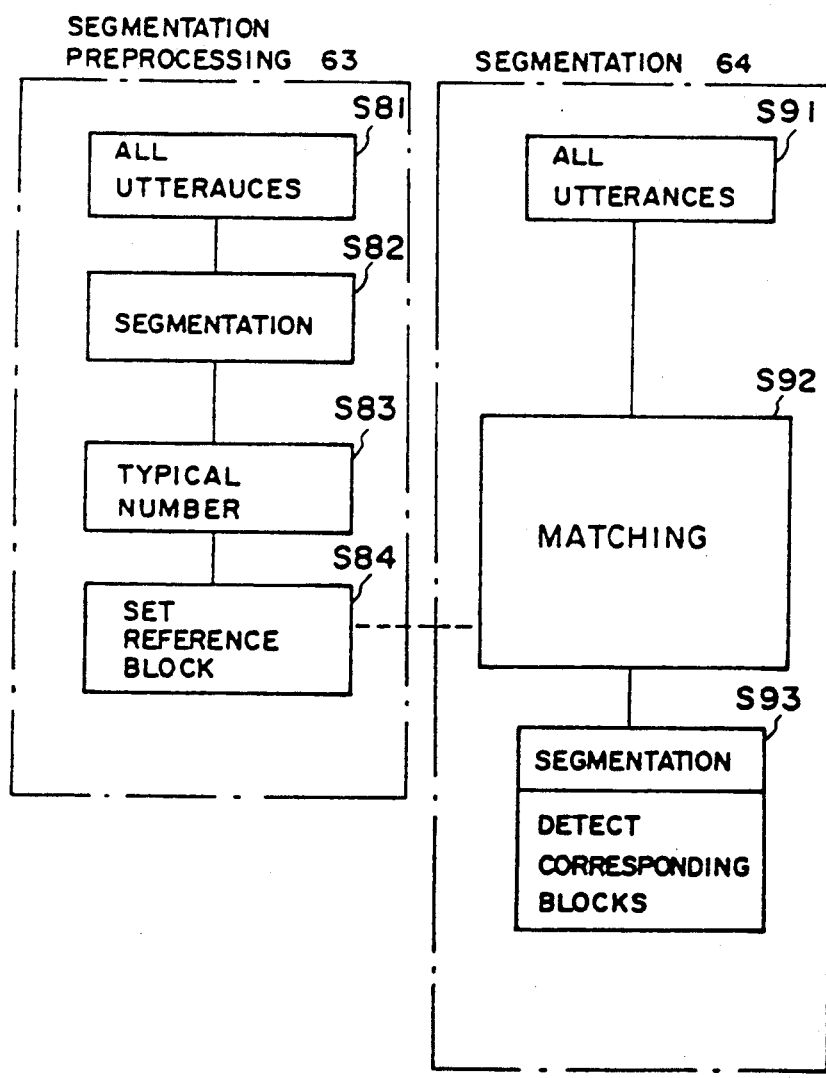
FIG.19 is a block diagram which illustrates a further structure of each of the segmentation preprocessing part 63 and the segmentation 64 of the sixth embodiment.

A description is given of a further example of the processing implemented by the segmentation preprocessing part 63 and the segmentation part 64 with reference to FIG.19. In the embodiment of FIG.19, a plurality of utterances of the same word are used for the purpose of obtaining reference blocks with respect to an utterance to be verified. The segmentation preprocessing part 63 calculates the typical number of blocks in the utterances (steps S81 to S83). This is done by segmenting each of all the utterances of the same word into blocks by using the power of each utterance, dips in the time-varying power thereof, or the rate of spectral change thereof, and then calculating the arithmetical average of the number of blocks over all the utterances. Then the segmentation preprocessing part 63 selects, as reference blocks for the utterances of the same word, blocks of the utterance having the number identical to the typical number of blocks. The selected reference blocks are used for segmenting an utterance to be verified into a plurality of blocks at the time of speaker verification. This segmentation can be done by using one of the aforementioned segmentation processes.

Figure 20:
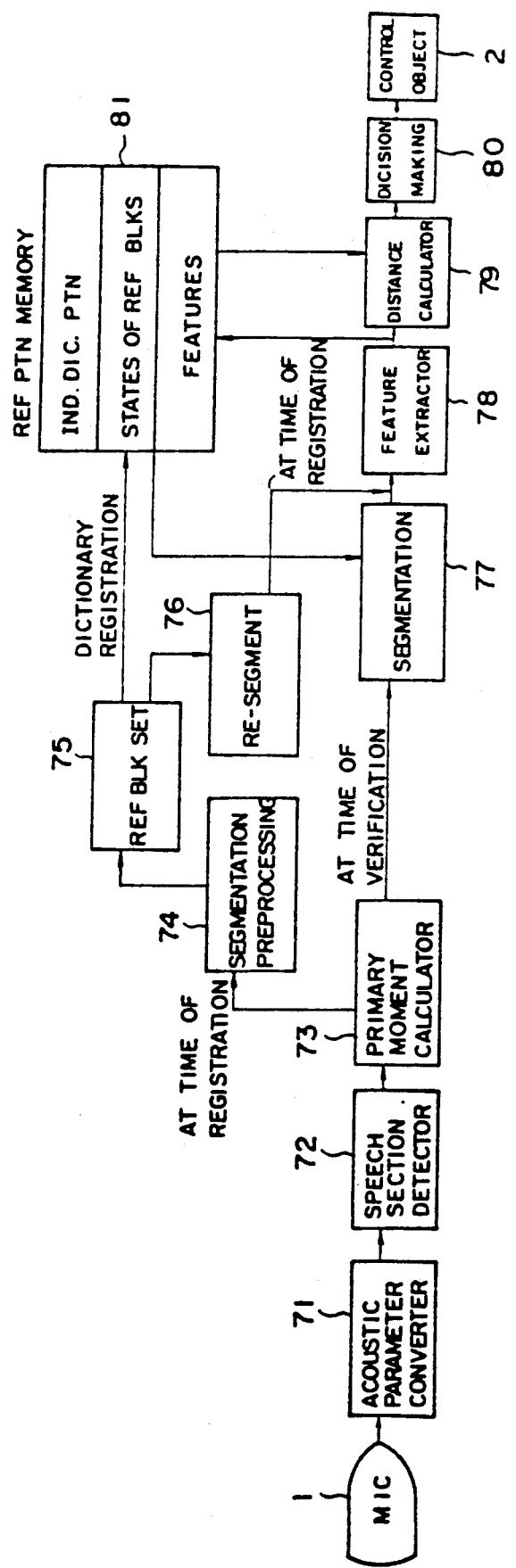
FIG.20 is a block diagram of a seventh embodiment of the present invention.

A description is given of the seventh embodiment of the present invention with reference to FIG.20. An essential feature of the present embodiment is that the segmentation is performed by calculating a primary moment of the spectrum obtained every block, and finding successive primary moment values which satisfy a predetermined criterion.

Referring to FIG.20, an acoustic parameter converter 71 divides an input speech signal into frames at time intervals of 10 milliseconds, and successively converts each frame into time-series spectral patterns ($\{f_1, f_2, \ldots, f_{29}\}$). In this case, as described previously, the frequency spectrum $f_{ij}$ of the frame at time i can be described as shown in the aforementioned formula (1). A speech section detector 72 detects a speech section of the input speech signal by using the spectral patterns of the frequency spectrum derived from the acoustic parameter converter 71. For example, the frame power defined by the aforementioned formula (2) may be used. Then, a primary moment of the spectrum of each frame is calculated by a primary moment calculator 73. The primary moment of the frequency spectrum at time i is defined as follows:

$$m_i = \sum_{j=1}^{29} j \cdot f_{ij} / \sum_{j=1}^{29} f_{ij} \tag{6}$$

where "$m_i$" denotes the position of the center (center-gravity) of the spectrum at time i, and has a value between 1 and 29.

Normally, spectral components of a voiced sound concentrate on a low-frequency range, and spectral components of an unvoiced sound concentrate on a high-frequency range. Therefore, the primary moment has relatively small values in voiced sound sections and, on the other hand, has relatively large values in unvoiced sound sections. Further, the primary moment in silence sections has values around the center channel (15th channel). However, it is noted that phonetic sounds whose power concentrates on the center channel or its vicinity, has primary moment values similar to a silence section, the primary moment of which concentrates also on the center channel or its vicinity. As a result, it is impossible to discriminate phonetic sounds from unvoiced sounds. Further, noise contained in silence sections causes a great change of values of the primary moment defined by the aforementioned formula (6). Therefore, the primary moments defined by the formula (6) are somewhat lacking in stability as parameters used for segmentation.

From the above-mentioned viewpoints, in the seventh embodiment, an additional frequency channel is provided under the lowest frequency channel or the highest frequency channel out of the 29 frequency channels. The additional frequency channel is provided with a predetermined power value served as a weighting factor W. A weighted primary moment of the spectrum is calculated for every frame. In a case wherein the additional frequency channel is provided under the lowest frequency channel, the spectrum at time i can be described as follows:

$$f_{ij} = (W, f_{i2}, f_{i3}, \ldots, f_{i30}) \tag{7}$$

(j = 2, 3, ..., 30)

The low-frequency-band-weighted primary moment is calculated for every channel by the following formula:

$$m_i = \sum_{j=2}^{30} j \cdot (f_{ij} + W) / \left( \sum_{j=2}^{30} f_{ij} + W \right) \tag{8}$$

By using the low-frequency-band-weighted primary moment, voiced sounds, unvoiced sounds and silence are mutually discriminated.

Figure 21A:
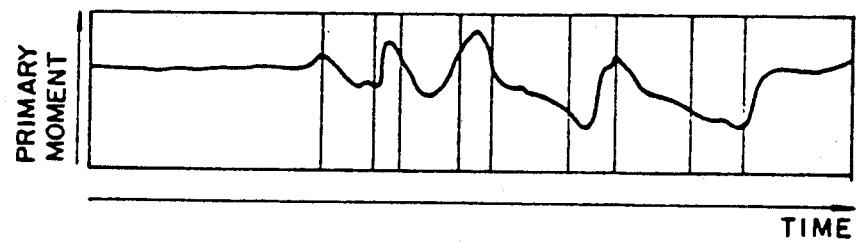
FIGS.21A through 21C are views for explaining an example of the segmentation of the seventh embodiment.
Figure 21B:
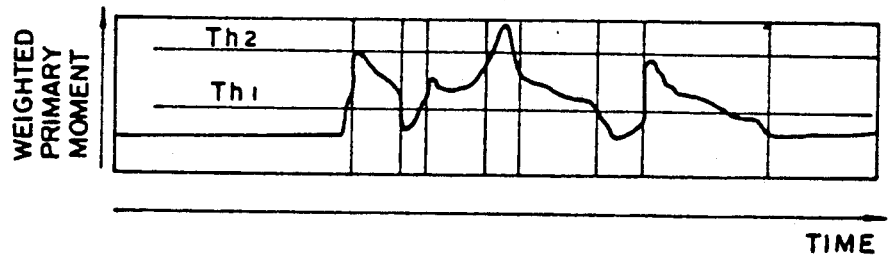
Figure 21C:
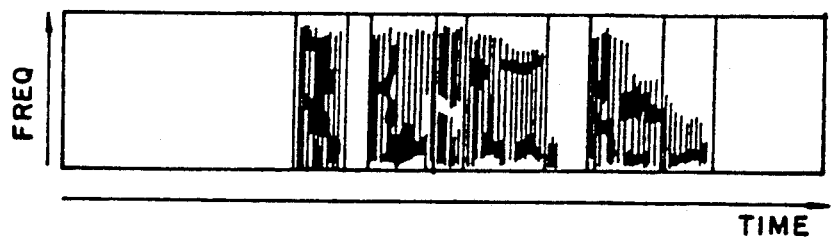

FIG.21C is a spectrogram of a word pronounced as "akujunkan". FIG.21A shows the corresponding primary moment as a function of time obtained by the formula (6). FIG.21B shows the corresponding low-frequency-band-weighted primary moment as a function of time obtained by the formula (8). As shown in FIG.21B, two threshold values Th1 and Th2 are used for discriminating voiced sections, unvoiced sections, and silence sections. A section having values of the low-frequency-band-weighted primary moment smaller than the threshold value Th1 is a silence section. A section between the threshold values Th1 and Th2 is a voiced section. A section having values exceeding the threshold value Th2 is an unvoiced section. As can be seen from FIGS.21A and 21B, values of the primary moment in voiced sections are decreased due to the function of the additional channel having the lowest frequency band.

Figure 22:
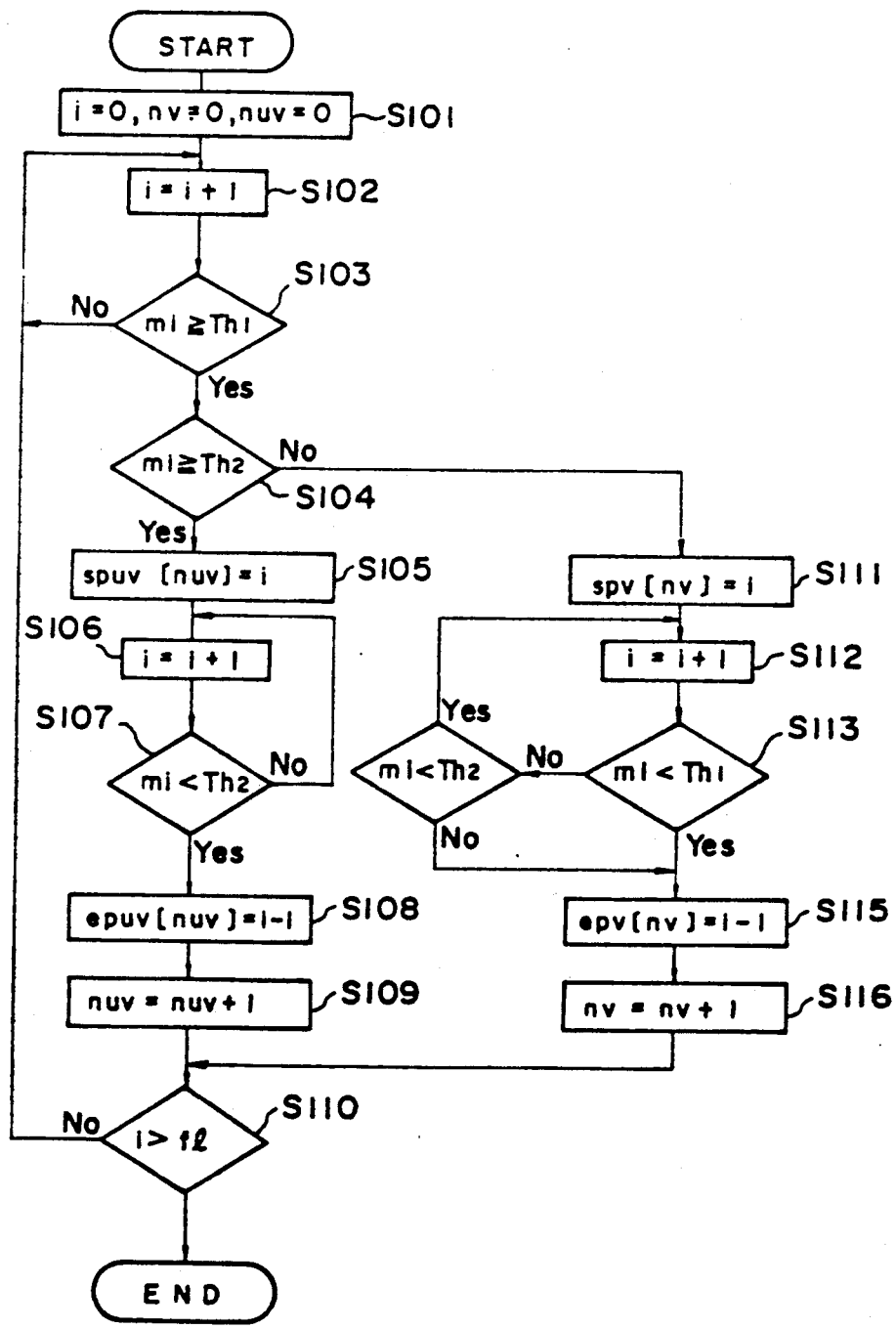
FIG.22 is a flowchart of the segmentation procedure of the seventh embodiment.

A procedure of the discrimination operation by a segmentation preprocessing part 74 of FIG.20 is shown in FIG.22. By this procedure, input speech signals used for obtaining reference blocks are segmented into a plurality of blocks. Referring to FIG.22, i is time (frame), nv denotes the number of voiced sections, and nuv denotes the number of unvoiced sections. Further, spv[nv] and epv[nv] denote starting and ending positions of the nv-th voiced section, respectively. Moreover, spuv[nuv] and epuv[nuv] denote starting and ending positions of the n-th unvoiced section, respectively.

First, the initialization is performed and time i is incremented by 1 (steps S101 and S102). After that, a position at which the weighted primary moment $m_i$ exceeds the threshold value Th1 or Th2, is detected (steps S102 to S104). For example, when $m_i \geq Th1$ and $m_i < Th2$, the procedure proceeds to step S111, where current time i is stored in a storage area of spv[nv] provided in a memory built in the primary moment calculator 73 shown in FIG.20. Thereafter, a loop consisting of steps S112 to S114 is repetitively processed until $Th1 \geq m_i \geq Th2$ is detected. When the above condition is satisfied, time (i−1) is stored in a memory area of epv[nv], and the number of voiced sections nv is incremented by 1 (steps S115 and S116). In this manner, voiced sections are discriminated, and starting and ending positions thereof are stored.

On the other hand, when $m_i \geq Th2$ is detected (steps S102 to S104), that time i is stored in a memory area of spuv[nuv] (step S105). After that, when $m_i < Th2$ is detected (step S107), time (i−1) is stored in a memory area of epuv[nuv], and the number of unvoiced sections is incremented by 1 (steps S108 and S109). In this manner, unvoiced sections are discriminated, and starting and ending positions thereof are stored. The above-mentioned procedure is repetitively performed until all the frames fl are processed (step S11). As described previously, it is enough to detect voiced sections for segmentation. Therefore, steps S105 to S109 may be omitted.

On the other hand, in a case where an additional frequency channel is provided above the highest frequency channel out of the 29 frequency channels, a high-frequency-band-weighted primary moment is calculated by $$m_i = \left( \sum_{j=1}^{29} j \cdot (f_{ij}) + 30 \cdot W \right) / \left( \sum_{j=1}^{29} f_{ij} + W \right) \quad (9)$$

Figure 23:
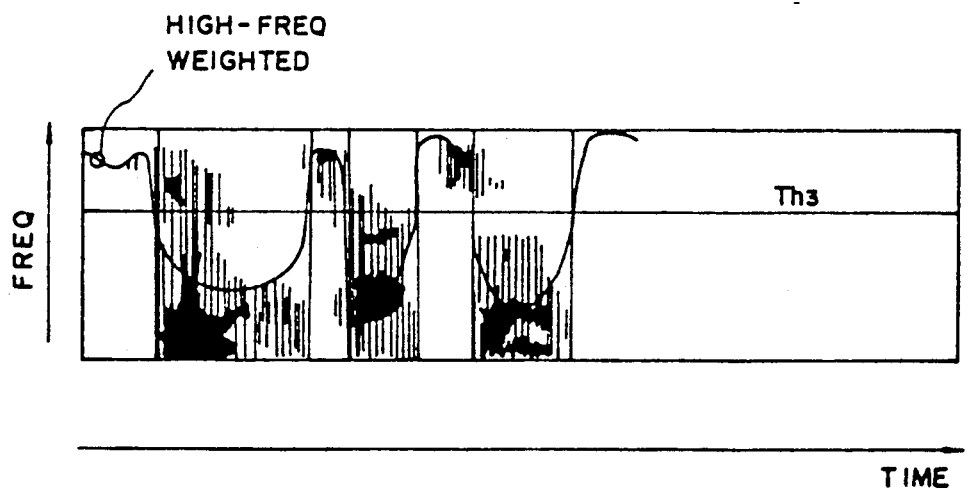
FIG.23 is a view for explaining another example of the segmentation of the seventh embodiment.

FIG.23 shows a spectrogram of a spoken word and the high-frequency-band-weighted primary moment as a function of time. It can be seen from FIG.23 that values of the weighted primary moment in unvoiced and silence sections are increased by the presence of the additional channel of the highest frequency band. Therefore by setting an appropriate threshold value Th3, it is possible to detect voiced sections.

Figure 24:
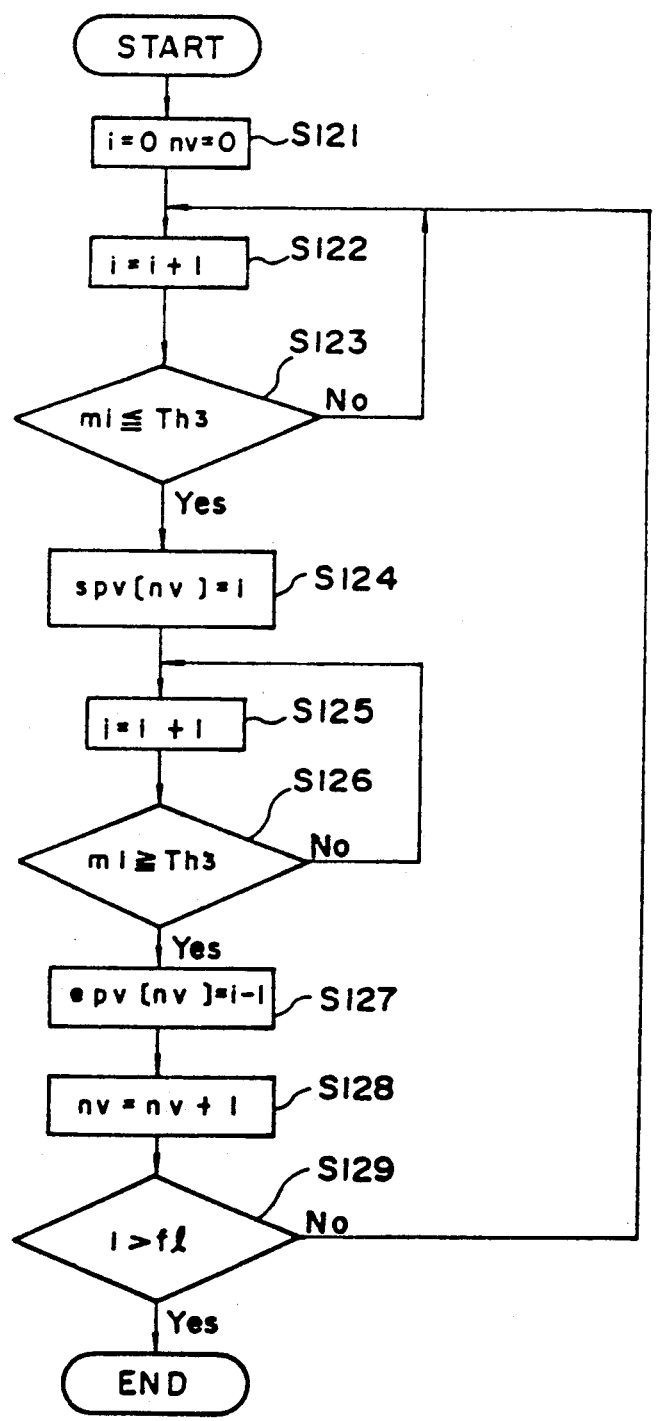
FIG.24 is a flowchart of a procedure of the segmentation shown in FIG.23.

The segmentation preprocessing part 74 may segment the speech section into a plurality of blocks by using the high-frequency-band-weighted primary moment. This segmentation procedure is shown in FIG.24. Referring to FIG.24, in step S121, time i and the number of voiced sections n are initialized (i=0, n=0). After incrementing time i by 1 (step S122), a frame position (time) is detected at which the value of the weighted primary moment $m_i$ becomes equal to or smaller than the predetermined threshold value Th3 (step S103). At this time, time i is stored in the memory area of spv[nv] (step S124). During a time when values of the weighted primary moment $m_i$ are smaller than the threshold value Th3, time i is incremented (steps S125 and 126). When the value of the weighted primary moment $m_i$ becomes Oqual to or larger than the threshold value Th3 (step S126), time i−1 is stored in the memory area epv[nv] (step S127). Then the number of voiced sound blocks nv is incremented by 1 (step S128). The above-mentioned procedure is repetitively performed until all the frames fl are processed (step S129).

Then the segmentation preprocessing part 74 segments the speech sections of all the utterances used for obtaining reference blocks, into blocks by using one of the aforementioned weighted primary moments. Thereafter, a reference block setting part 75 selects, as reference blocks for the spoken word to be registered, blocks from among blocks of all the utterances. Blocks having the smallest or largest number of blocks may be selected as reference blocks. Alternatively, blocks having the median number of blocks may be selected as reference blocks. It is also possible to use the following procedure for the selection of reference blocks. First, corresponding blocks are selected from all the utterances. Then the average of the frame lengthes of the corresponding blocks is calculated. Then one of the utterances which has the block length closest to the calculated average is selected as reference blocks. The reference blocks thus obtained are registered in a reference pattern memory 81. At this time, the reference block setting part 75 calculates the average value of the primary moment within each of the reference blocks, and registers, in a reference pattern memory 81, those average values of the primary moment as states of the reference blocks.

On the basis of the average value of the primary moment of each reference block (preferably weighted primary moment), a re-segmentation part 76 segments each of all the utterances including the utterance whose blocks are selected as reference blocks into a plurality of blocks. The re-segmentation is carried out by using the aforementioned duration time length control type state transition model.

Figure 25:
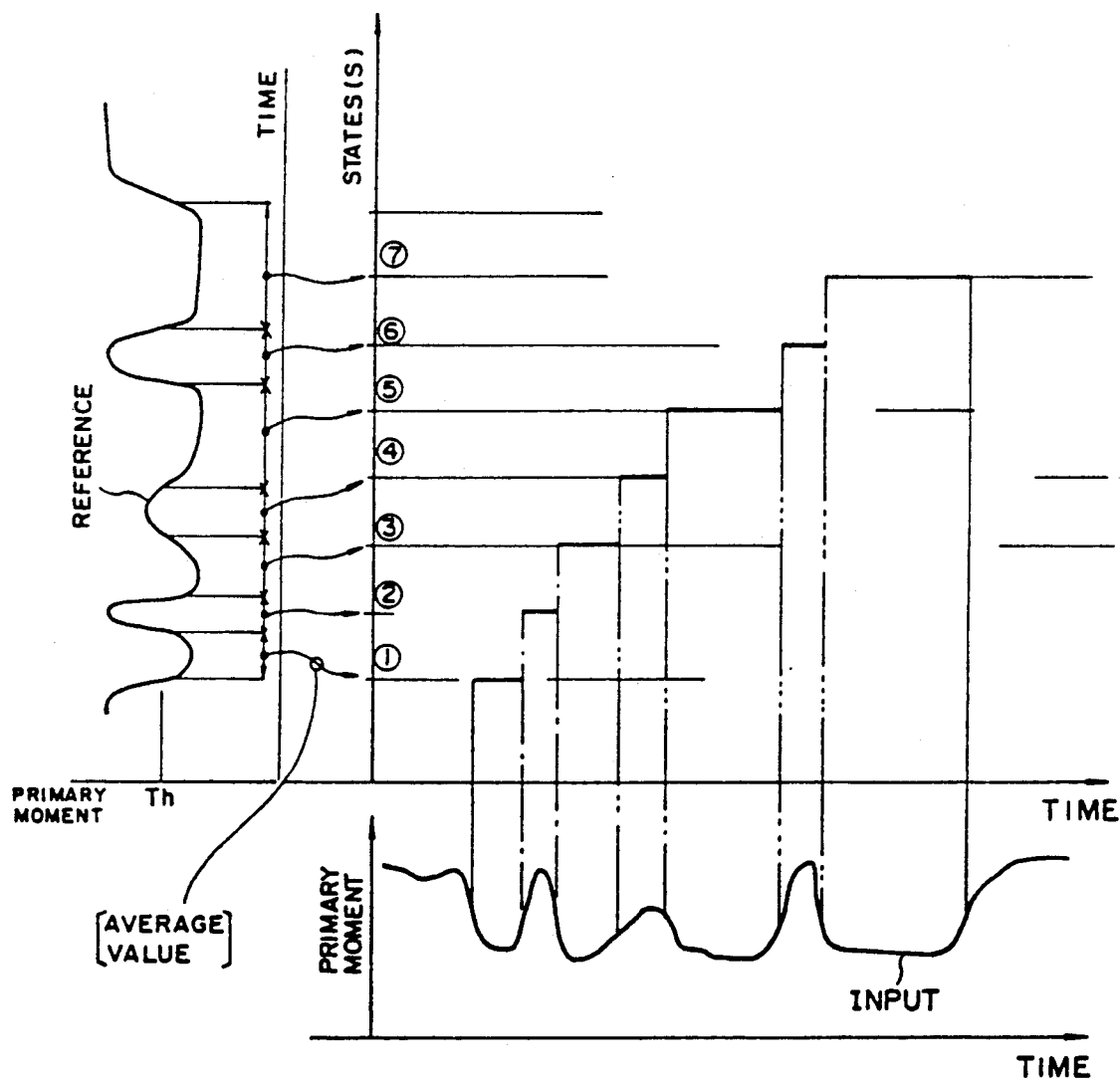
FIG.25 is a view which illustrates the feature extraction process of the seventh embodiment.
Figure 26A:
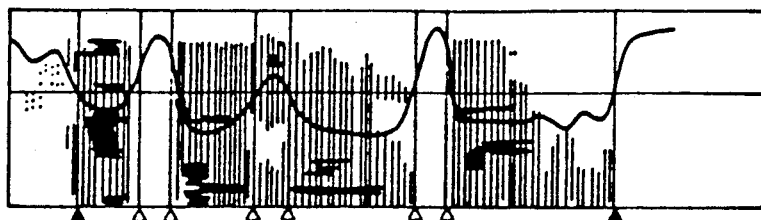
FIG.26A-E shows spectrograms obtained by the re-segmentation process performed in the seventh embodiment of the present invention.
Figure 26B:
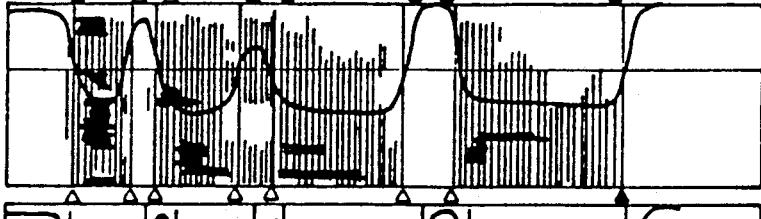
Figure 26C:
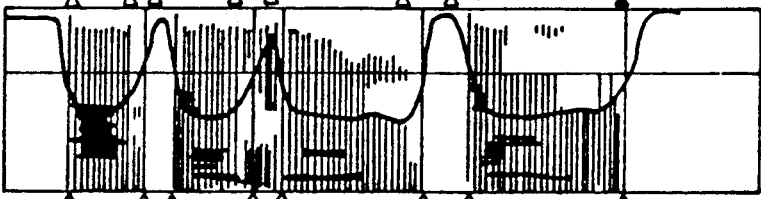
Figure 26D:
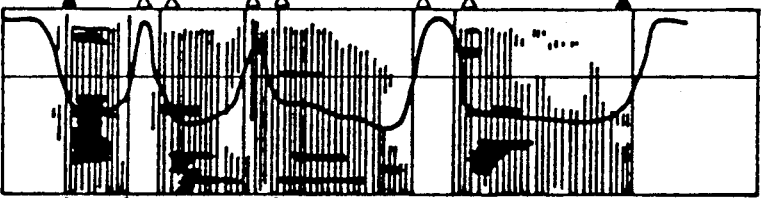
Figure 26E:
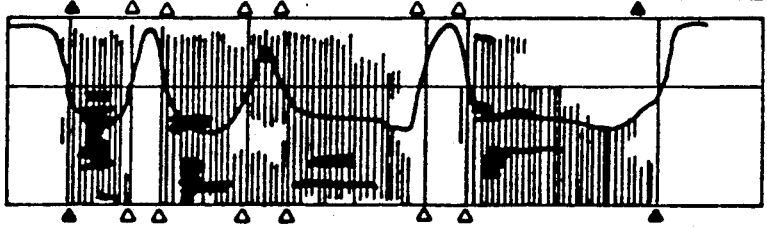

FIG.25 shows an example of the re-segmentation. The weighted primary moment of the reference utterance is shown as a function of time along the vertical axis taken for states s of the reference blocks. The time function of the weighted primary moment of one of the utterances of the same word as the reference utterance is shown along the horizontal axis taken for time (frame) i of the input utterance. The average of the primary moment obtained every reference block is given to the vertical axis as states ① to ⑦. Segmentation positions with respect to the input utterance are determined by comparing values of the weighted primary moment of the input utterance with the average of the primary moment of each reference block.

FIGS.26A through 26E show results obtained by the re-segmentation with respect to five utterances of the same word, in which the reference utterance of FIG.25 is used. It can be seen from FIGS.26A through 26E that almost the same segmentation positions are obtained for the utterances.

A feature extractor 78 extracts features of the speech signal for every block, by calculating the arithmetical average of frame powers over each block for every channel. At the time of registration of reference features, the feature calculator 78 selects the average spectra of corresponding blocks from all the utterances, and calculates the average of the average spectra selected for every corresponding blocks and/or the dispersion thereof. Then the features thus calculated are registered in a reference pattern memory 81 together with a file name assigned to the speaker. The features obtained for every block are served as features of the related reference blocks.

At the time of speaker verification, the segmentation part 77 performs pattern matching between the primary moment of the utterance within the speech section and the states (average values of the primary moment) of the reference blocks of the registered speakers. The above-mentioned pattern matching is carried out by using the duration time length control type state transition model. By the pattern matching, segmentation positions with respect to the input speech signal to be verified are obtained. The feature extractor 78 extracts features of the input speech signal to be verified by calculating the arithmetical average of frame powers over each block for every channel. Then, a distance calculator 79 calculates the distance between the features of the unknown speaker and each of the registered speakers.

A decision making part 80 makes a decision as to whether the unknown speaker is a real speaker or impostors by comparing the calculated distance with the predetermined threshold value.

Figure 27:
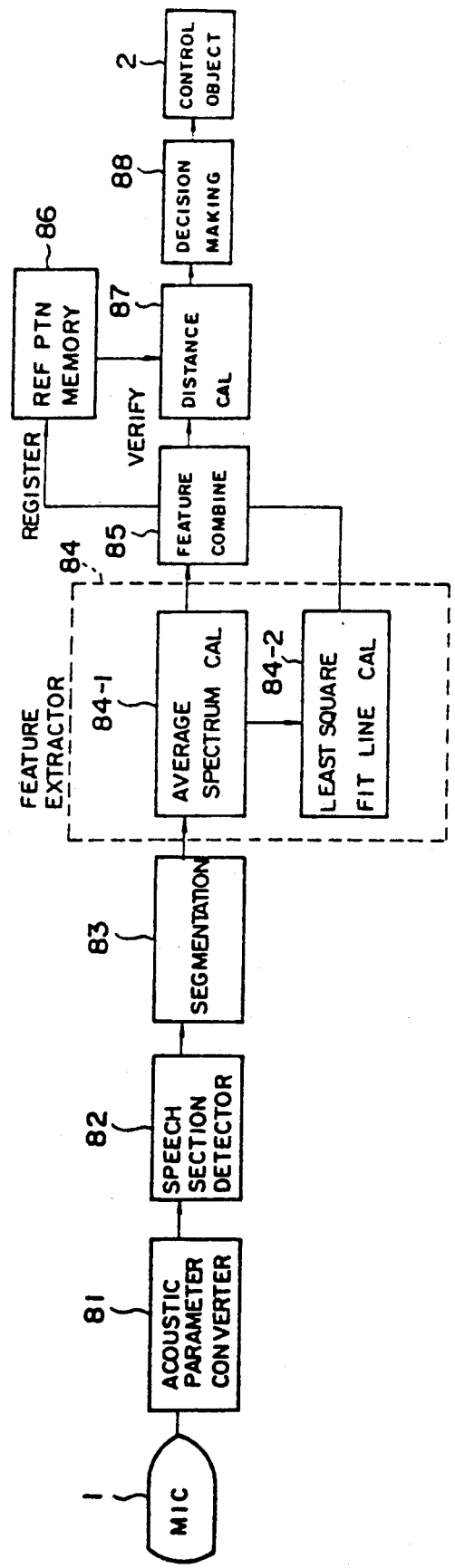
FIG.27 is a block diagram of an eighth embodiment of the present invention.

FIG.27 shows the eighth embodiment of the present invention. An acoustic parameter converter 82, a speech section detector 82 and a segmentation part 83 are the same as the corresponding parts in the aforementioned embodiments.

A feature extractor 84 consists of an average spectrum calculator 84-1 and a least square fit line calculator 84-2. The average spectrum calculator 84 extracts features Xavr for every block by calculating the arithmetical average of frame powers over each block for every channel by the aforementioned formula (4). The least square fit line calculator 84-2 calculates the least square fit line with respect to features Xavr of all the blocks in the speech section, in which the feature Xavr of each block is considered as one spectrum. Then the least square fit line calculator 84-2 calculates a gradient Xa of the obtained least square fit line. The gradient Xa is served as one feature parameter.

A feature combining part 85 combines features Xavr and Xa for every block. The total feature for the k-th block, Xk is described as follows:

$$Xk = (Xavr, Xa) \quad (10)$$

At the time of feature registration, the feature combining part 85 registers, as reference features (dictionary pattern), the feature Xk of each block into a reference pattern memory 86, together with a file name given to the speaker. On the other hand, at the time of speaker verification, a distance calculator 87 calculates the distance between the features of the unknown speaker and the registered reference features for every corresponding blocks.

The distance d(X, Z) is calculated as follows:

$$d(X, Z) = \sum_{k=1}^{n} dis(Xk, Zk) \quad (11)$$

where X is a dictionary pattern, and Z is a speech pattern of the unknown speaker. Further, dis(Xk, Zk) denotes the sum of corresponding features of corresponding blocks, and is represented as:

$$dis(Xk,Zk) = w1 \times dis(Xavr, Zavr) + w2 \times dis(Xa,Za) \quad (12)$$

In the distance calculations of dist(Xavr, Zave) and dist(Xa, Za), Euclidean distance or Maharanobis' distance may be used. It is noted that w1 and w2 are weighting factors with respect to the respective distances. Values of those weighting factors are determined by the aforementioned F ratio.

A decision making part 88 compares the distance supplied from the distance calculator 87 with a threshold value, which is predetermined depending on each speaker. Then the decision making part 88 makes a decision as to whether the unknown speaker is a real speaker or impostors on the basis of the comparison result.

Figure 28:
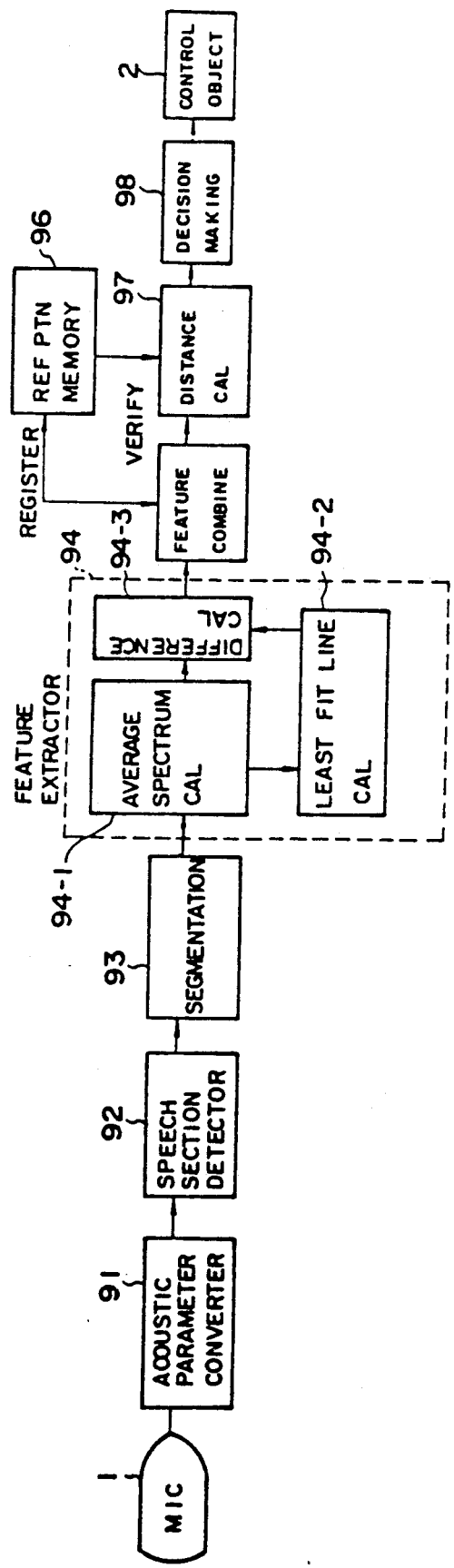
FIG.28 is a block diagram of a ninth embodiment of the present invention.

FIG.28 shows the ninth embodiment of the present invention. An essential feature of the ninth embodiment is as follows. A feature extractor 94 is made up of an average spectrum calculator 94-1, a least square fit line calculator 94-2 and a difference calculator 94-3. The feature extractor 94 extracts features for every block by calculating the average spectrum for every block. The least square fit line 94-2 calculates the least square fit line from the average spectrum of each block. Then the difference calculator subtracts the least square fit line from the features extracted every block. This calculation presents a general shape of the time-series spectral patterns. Other parts of FIG.28 are the same as the corresponding parts shown in the previous figures.

Figure 29:
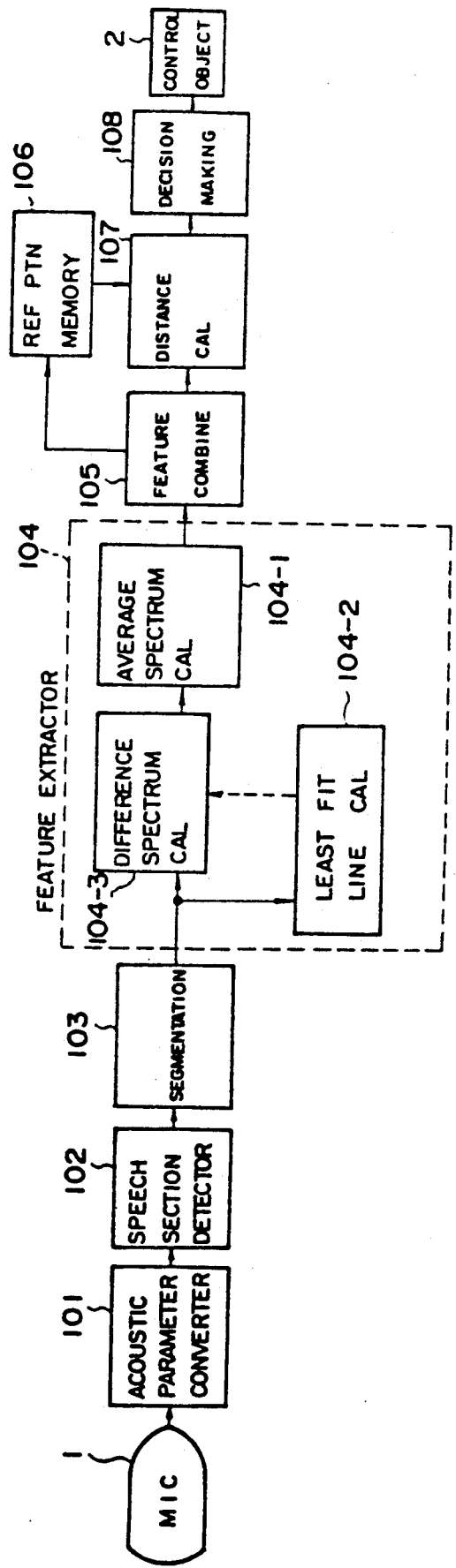
FIG.29 is a block diagram of a tenth embodiment of the present invention.

FIG.29 shows the tenth embodiment of the present invention. An essential feature of the tenth embodiment is as follows. A feature extractor 104 is made up of an average spectrum calculator 104-1 and a least square fit line calculator 104-2, and a difference calculator 104-3. The least square fit line calculator 104-2 calculates the least square fit line with respect to a general shape (an envelope) of the spectrum for every frame within each block by using data supplied from a segmentation part 103. Then the calculator 104-3 produces a spectrum for every frame by subtracting the least square fit line from the corresponding spectrum shape. The produced spectrum of each frame has much individuality information. Then the average spectrum calculator 104-1 calculates, for every channel, the arithmetical average of powers of the produced time-series spectral patterns over each block. The average power obtained every block is served as a feature parameter. Other parts of FIG.29 are the same as the corresponding parts of FIG.28.

Figure 30:
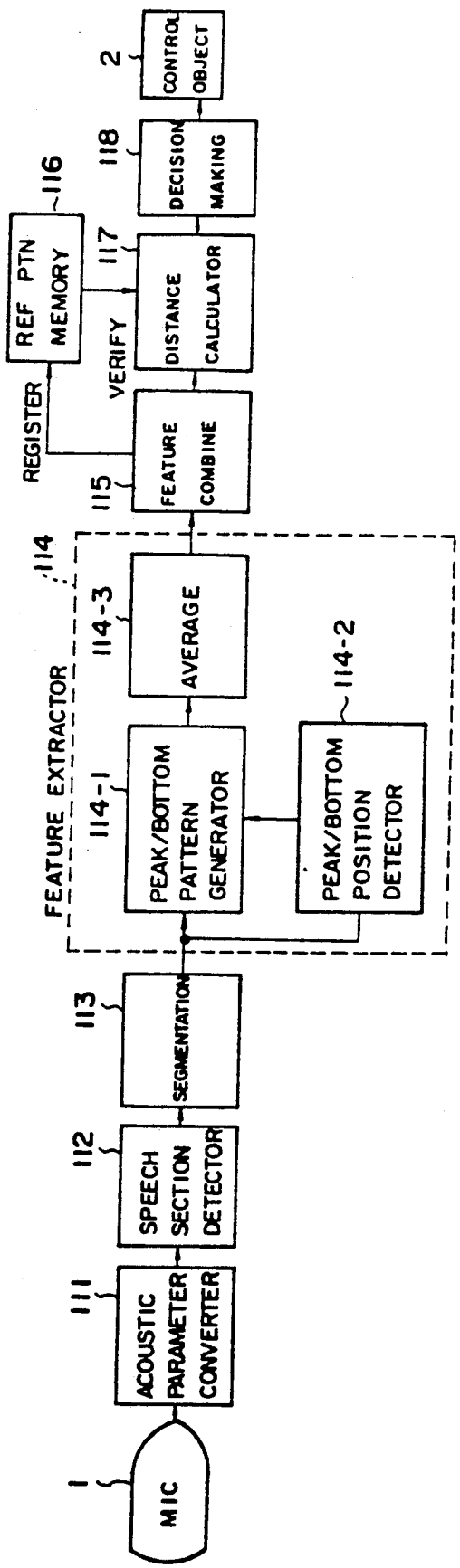
FIG.30 is a block diagram of an eleventh embodiment of the present invention.

A description is given of the eleventh embodiment of the present invention with reference to FIG.30. In the eleventh embodiment, features are described by using information on the peak and the bottom in the spectrum of each frame. A feature extractor 114 is made up of peak/bottom pattern generator 114-1, a peak/bottom position detector 114-2, and an arithmetical average calculator 114-3.

The peak/bottom position extractor 114-2 investigates which channels have a peak (maximum power) and bottom (minimum power) in the spectrum of the i-th frame within the k-th block. The position of a peak of the spectrum of each frame is written as follows:

$$TOP_{kij} = (TOP_{ki1}, TOP_{ki2}, \ldots, TOP_{ki29}) \quad (13)$$

where $TOP_{kij}=1$: in a case when the j-th channel has a peak;
$TOP_{kij}=0$: in a case when the j-th channel does not have a peak;
k: k-th block;
i: time in the k-th block; and
j: frequency channel number.

The peak/bottom converter 114-1 generates a time-series pattern consisting of $TOP_{kij}$ for every block.

The feature of each block is extracted by calculating the arithmetical average of $TOP_{kij}$ obtained for every frame over each block. This is done by the arithmetical average calculator 114-3. The above arithmetical average TOPavr is obtained by the following formula:

$$TOPavr = (1/m) \times \sum_{i=1}^{m} TOP_{kij} \qquad (14)$$
$$= [\overline{TOP}_{k1}, \overline{TOP}_{k2}, \ldots, \overline{TOP}_{k29}]$$

where m denotes the number of frames within the k-th block, and $\overline{TOP}_{kj}$ (j=1, 2, ..., 29) denotes the average of the number of peaks obtained for every channel within the k-th block.

Similarly, a bottom in the spectrum of each frame is processed. That is, the peak/bottom position detector 114-2 investigates which channel has a bottom in the spectrum for every frame. Then the peak/bottom pattern generator 114-1 generates a time-series pattern defined by the following formula:

$$BTM_{kij}=(BTM_{ki1}, BTM_{ki2}, \ldots, BTM_{ki29}) \qquad (15)$$

where
$BTM_{kij}=1$: in a case when the j-th channel has a bottom;
$BTM_{kij}=0$: in a case when the j-th channel does not have a bottom;
k: k-th block;
i: time in the k-th block; and
j: frequency channel number.

The feature of each block is extracted by calculating the arithmetical average of $BTM_{kij}$ obtained for every frame over each block. This is done by the arithmetical average calculator 114-3. The above arithmetical average BTMavr is obtained by the following formula:

$$BTMavr = (1/m) \times \sum_{i=1}^{m} BTM_{kij} \qquad (16)$$
$$= [\overline{BTM}_{k1}, \overline{BTM}_{k2}, \ldots, \overline{BTM}_{k29}]$$

where m denotes the number of frames within the k-th block, and $\overline{BTM}_{kj}$ (j=1, 2, ..., 29) denotes the average of the number of peaks calculated for every channel within the k-th block.

A feature combining part 115 combines the features TOPavr and BTMavr, and produces a new feature of the entire k-th block, Xk as follows:

$$Xk = (XTOPavr, XBTMavr) \qquad (17)$$

A distance calculator 117 calculates, for every block, the distance between the features of the unknown speaker and each of the registered speakers. Assuming that the dictionary pattern is described as X, and the speech pattern of the unknown speaker is described as Z, the distance d(X, Z) therebetween is represented as follows:

$$d(X, Z) = \sum_{k=1}^{n} dis(Xk, Zk)$$

where n denotes the number of blocks. The distance d(Xk, Zk) denotes the sum of the distances between corresponding features of corresponding blocks, and is represented as follows:

$$dis(Xk, Zk) = w3 \times dist(XTOPavr, ZTOPavr) + w4 \times dist(XBTMavr, ZBTMavr) \qquad (18)$$

In the distance calculations of dist(XTOPavr, ZTOPavr) and dist(XBTMavr, ZBTMavr), Euclidean distance or Maharanobis' distance may be used. It is noted that w3 and w4 are weighting factors with respect to the respective distances. Values of the weighting factors w3 and w4 may be determined depending on the F ratio.

In the embodiment of FIG.30, features of blocks are described by information on positions of peak and bottom of the spectrum in each frame. Alternatively, it is possible to add to the above information some information such as the aforementioned average spectrum of each block and the gradient of the least square fit line associated twelfth. In this case, feature parameters are described as follows:

$$Xk = (Xavr, Xa, XTOPavr, XBTMavr) \qquad (19)$$

In this case, the sum of distances between corresponding blocks, dis(Xk, Zk) is calculated by the following formula:

$$dis(Xk, Zk) = w1 \times dist(Xavr, Zavr) + \qquad (20)$$
$$w2 \times dist(Xa, Za) + w3 \times dist(XTOPavr, ZTOPavr) +$$
$$w4 \times dist(XBTMavr, ZBTMavr)$$

In the respective distance calculations, Euclidean distance or Maharanobis' distance may be used. It is noted that w1 through w4 are weighting factors with respect to the respective distances.

Figure 31:
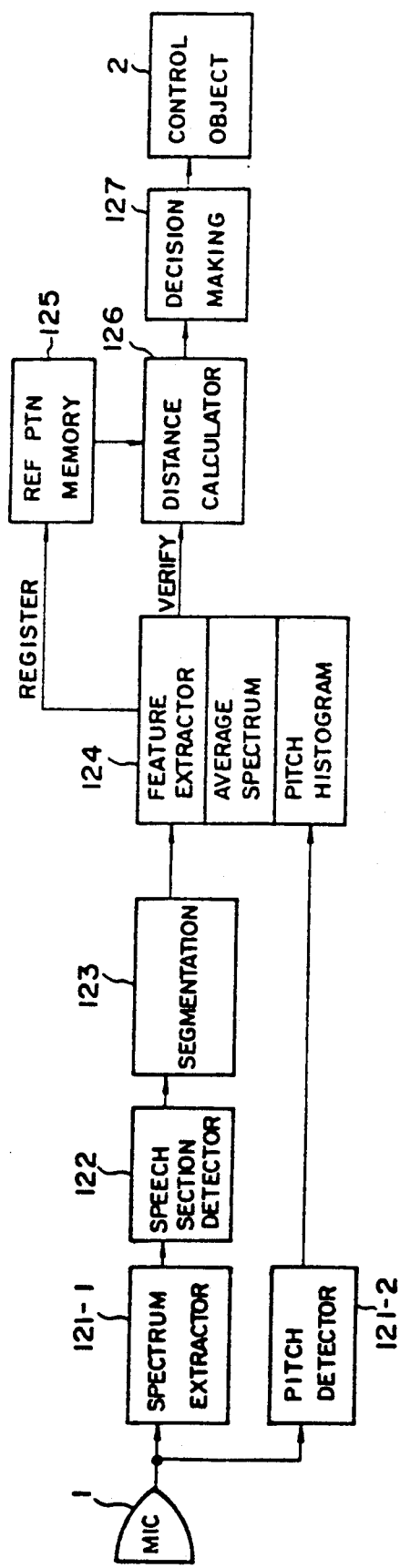
FIG. 31 is a block diagram of a twelfth embodiment of the present invention.

A description is given of the twelfth embodiment of the present invention with reference to FIG.31.

The aforementioned embodiments have the following basic procedures. An input speech signal is divided into a plurality of frames at time intervals of 10 milliseconds. Next, a speech section of the input speech signal is segmented into a plurality of blocks by using the acoustic parameters obtained for every frame. Then speaker-specific features are extracted by calculating, for every block, the arithmetical average of values of the acoustic parameters and dispersion thereof for every block.

On the other hand, it is noted that in order to describe speaker-specific features, it is important to use pitch information in addition to phonetic parameters such as the spectral data. The use of pitch information contributes to enhancing the verification rate. It is to be noted that time-varying patterns of pitch are greatly based on individuality, it is not preferable to use the arithmetical average of pitch periods or frequencies for the purpose of the feature extraction. From the above viewpoints, in the embodiment of FIG.31, a histogram of pitch periods of an input speech signal is produced for every block, whereby it becomes possible to obtain features which have information on pitch periods as well as time-varying behaviour thereof depending on individulality.

Referring to FIG.31, an input signal from the microphone 1 is divided into frames at time intervals of 10 milliseconds by an acoustic parameter converter (not shown for the sake of simplicity). Then, the frames are successively supplied to a spectrum extractor 121-1 and a pitch detector 121-2. The spectrum extractor 121-1 produces a time-series of spectral patterns. The pitch detector 121-2 produces a time-series of pitch data. The spectrum extraction procedure may be the same as that described in the foregoing. In the following description, it is assumed that the spectrum extractor 121-1 is constructed by a group of 29-channel bandpass filters which cover the center frequencies from 250-6300 Hz and which are arranged at every 1/6 octave. The detection of pitch periods can be performed by a numerical calculation such as an autocorrelation process. Alternatively, pitch periods can be detected by a structure including lowpass filters and counters. The detail of the latter pitch detection will be described later.

In the following description, the spectrum of a frame at time i is described as $f_{ij}$, and a pitch period at time i is described as $p_i$.

A speech section detector 122 detects a speech section of the input speech in the same way as the previous embodiments. A segmentation part 123 segments the speech section into a plurality of blocks by using the primary moment of the spectrum of each frame, as described previously. Then a feature extractor 124 extracts features of the input speech signal for every block. In the embodiment of FIG.31, the features are extracted in accordance with the aforementioned formula (4).

The feature extractor 124 creates a histogram of pitch periods every block. The pitch histogram created for every block may be described in the form of a graph, in which the horizontal axis represents pitch periods, and the vertical axis represents the number of each pitch period. In the following description, the pitch period at time i (or frame) within the k-th block is represented as $P_{ki}$. The number of identical pitch periods within the k-th block is counted. The counted number is defined as a feature point $P_{KL}$ where L is a variable indicating different pitch periods. Therefore, $P_{KL}$ denotes the number of pitch periods L within the k-th block.

At the time of registration of reference pitch periods, a plurality of utterances of the same word are separately supplied to the microphone 1. The feature extractor 124 produces spectrum-based reference features of the spoken word by calculating the arithmetical average of average spectra over corresponding blocks of the utterances. Further, the feature extractor 124 produces pitch-based reference features of the spoken word by calculating the arithmetical average of feature point $P_{KL}$ over corresponding blocks. Two different typies of features are registered into a reference pattern memory 125.

At the time of speaker verification, spectrum-based and pitch-based features of an unknown speaker extracted by the feature extractor 124 are compared, in a distance calculator 126, with the respective reference features of the registered speakers stored in the reference pattern memory 125. Then the distance between corresponding features of the unknown speaker and a selected one of the registered speakers is calculated for every block. A decision making part 127 compares the distance values with the respective predetermined threshold values, and makes a decision based on the comparison result.

Figure 32:
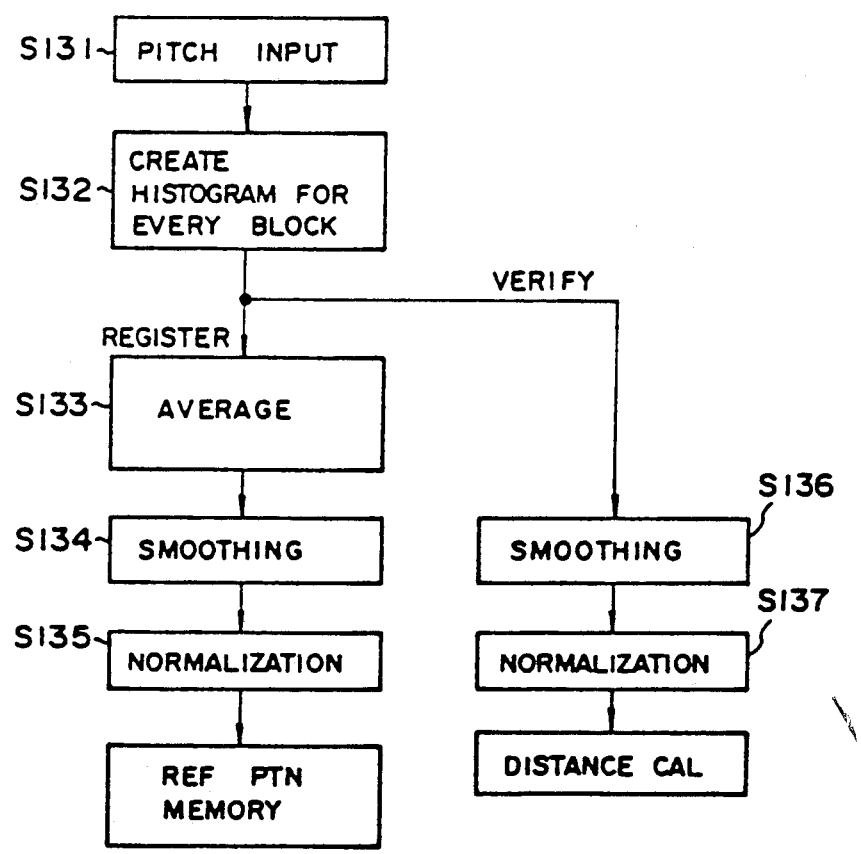
FIG.32 is a flowchart of a procedure for creating a pitch histogram.

FIG.32 shows another procedure of the feature extractor 124. Referring to FIG.32, pitch periods extracted by the pitch detector 121-2 are supplied to the feature extractor 124 (step S131). Then a pitch histogram is produced for every block (step S132). Thereafter, at the time of registering reference pitch histogram, the total number of the same pitch periods contained in corresponding blocks of all the utterances is calculated (step 133). Thereby a histogram is produced for every block, in which the feature point $P_{KL}$ represents the total number of the pitch period L contained in the corresponding blocks. Then the histogram thus produced is subjected to smoothing in the direction of the arrangement of pitch periods in the graph of the histogram (step S134). This smoothing is performed by arithmetically averaging the feature points $P_{KL}$ for every three to five successive pitch periods, for example. The average number is positioned at the center of a range consisting of the three to five pitch periods. Thereby a smoothed pitch histogram is obtained. Further, the smoothed pitch histogram is normalized by using the total power thereof (step S135). A smoothed and normalized pitch histogram thus formed every block is used as a reference pitch histogram.

On the other hand, at the time of speaker verification, a histogram of each block is subjected to the smoothing process in which the feature points of the pitch periods contained therein are summed for every three to five pitch periods, and is then smoothed (step S136). Then a smoothed histogram obtained for every block is normalized by using the total number of the feature points $P_{KL}$ (step S137). It is noted that the above-mentioned smoothing and normalization contribute to enhancing the reliability of the dictionary.

Figure 33:
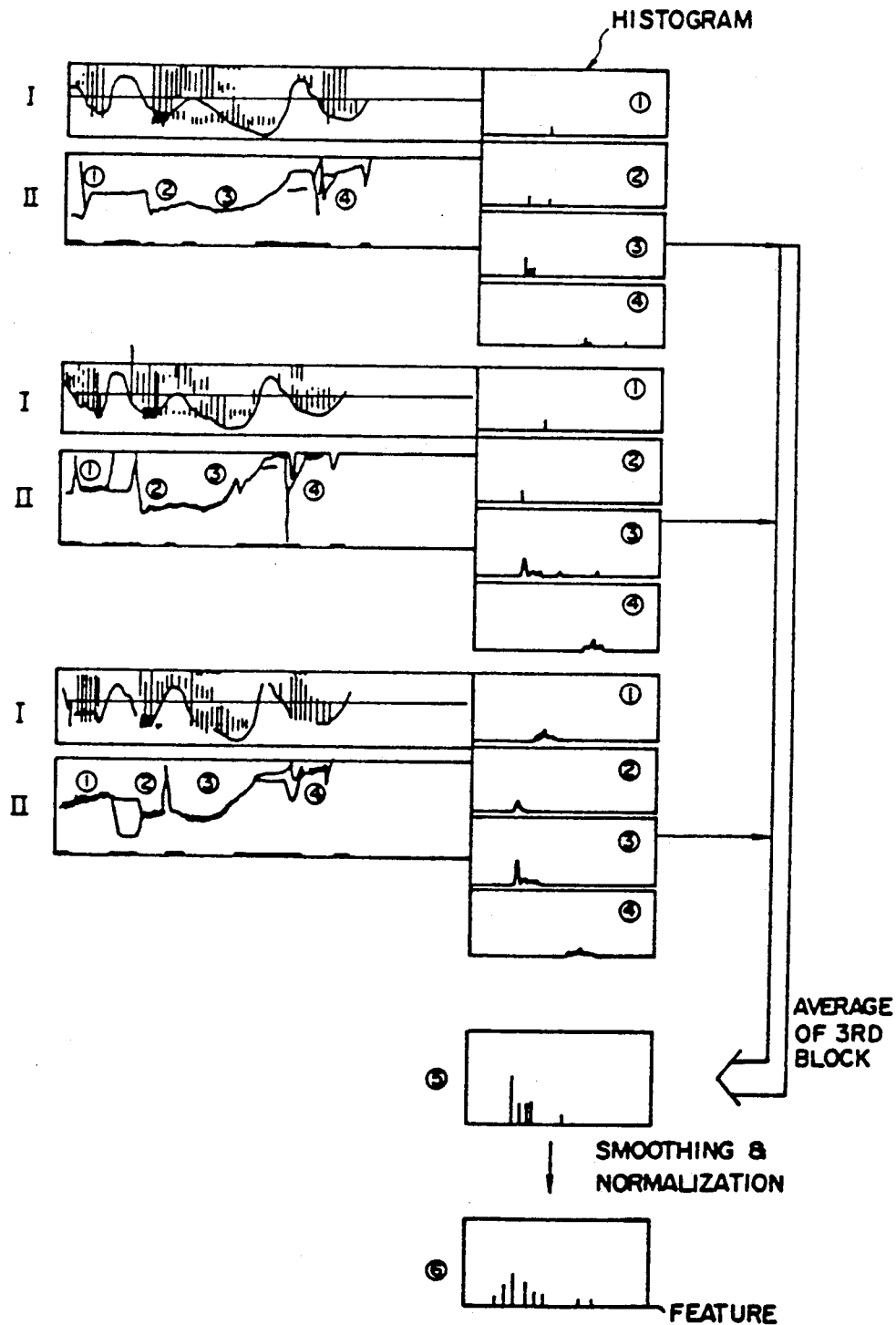
FIG.33 is a view showing an example of the pitch histogram creation procedure.

FIG.33 shows an example of the procedure of FIG.32, in which a reference pitch histogram is created by three utterances of the same word. In FIG.33, I shows a time-spectrum pattern, and II shows the pitch period as a function of time. The curvature shown in the each of the patterns I is the primary moment as a function of time. Graphs ①  to ④ are pitch histograms corresponding to four blocks of each utterance. The block ③ is now of concern for describing the procedure of producing features based on pitch periods. First, the block ③ is selected from the three utterances, and the feature point $P_{KL}$ of the same pitch period is summed over the three blocks ③. A result of this calculation is indicated by a reference ⑤. Then the histogram of the block ③ thus produced is smoothed in the direction of the axis taken for pitch periods. Thereafter, the smoothed histogram is normalized. A result of the normalization is indicated by a reference ⑥.

Figure 34:
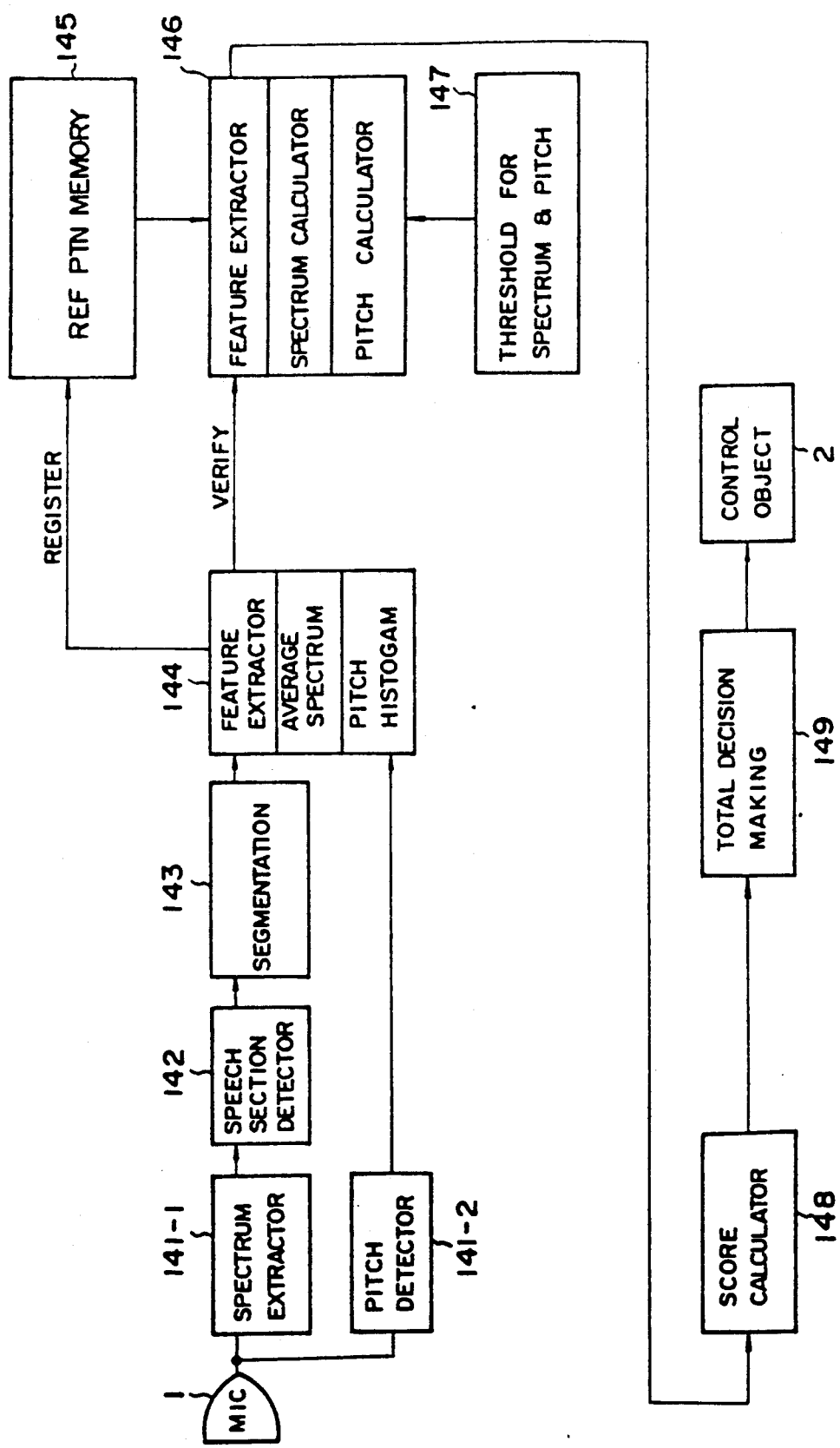
FIG.34 is a block diagram of a thirteenth embodiment of the present invention.

A description is given of the thirteenth embodiment of the present invention with reference to FIG.34. The embodiment of FIG.34 intends to obtain a further enhanced verification rate. It is noted that information on an error occurring in each block is lost in the case where an utterance of an unknown speaker is compared with reference utterances by using features obtained by summing the distance of each block and then averaging the summed distance. Further, the following should be noted. The frequency spectrum and pitch period have different dimensions. Therefore it is necessary to eliminate these dimensions. For this purpose, the feature parameters are normalized based on dispersion, and then the distance of each block is summed. It is noted that in this case, spectrum information and pitch period information are handled with the same weight. Therefore, there may be a case in which the distance in spectrum-based features between an unknown utterance and a reference utterance is large, whereas the difference in the pitch-based features therebetween is small. Further, another case may be caused in which the distance in the spectrum-based features is small, and on the other hand, the distance in the pitch-based features is large. These cases may decrease the verification rate.

From the above-mentioned viewpoints, in the distance calculation of the embodiment of FIG.34, spectrum-based and pitch-based features obtained for every block, are compared with respective threshold values, and a score is given to a combination of two comparison results. Then the total score is summed over all the blocks. Finally, the total score over all the blocks is compared with a predetermined threshold value.

Figure 14:
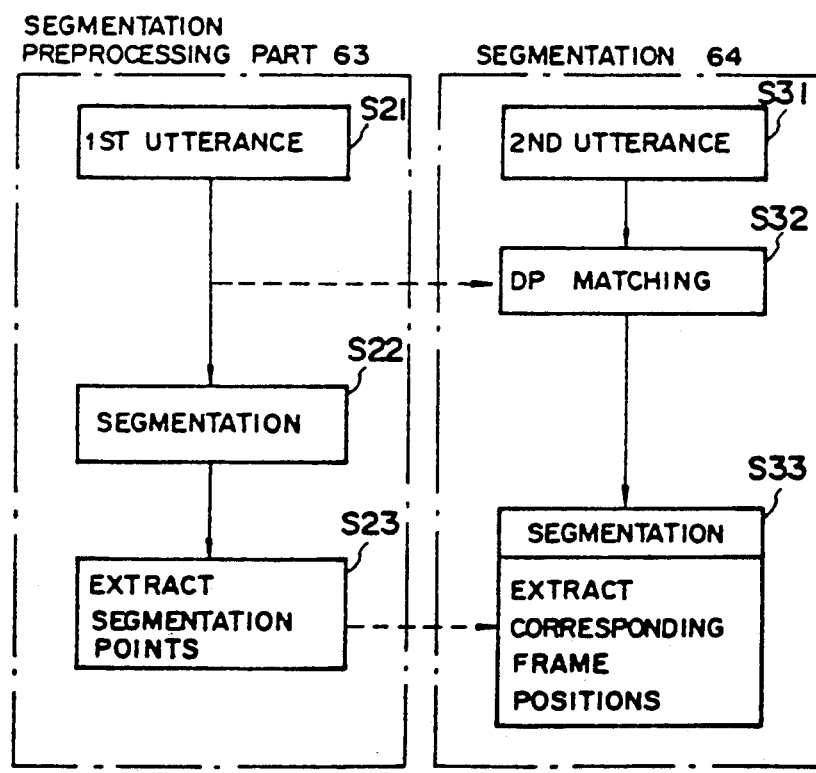
FIG.14 is a block diagram which illustrates a structure of each of the segmentation preprocessing part 63 and the segmentation part 64 of the sixth embodiment.

In FIG.14, those parts arranged prior to a distance calculator 146 are the same as the corresponding parts of FIG.31. At the time of speaker verification, the distance calculator 146 calculates, for every block, the distance between spectrum-based features of an unknown speaker and a selected one of the registered speakers, and the distance between pitch-based features thereof. The distance calculator 146 compares two calculation results with respective threshold values stored in a memory 147. Then a score calculator 148 gives a combination of the comparison results a score shown in FIG.35.

Referring to FIG.35, a mark o shown in columns showing comparison results denotes a case in which the calculated distance is smaller than the threshold value. A mark "x" shown in the same columns denotes a case where the calculated distance is equal to or larger than the threshold value. Marks (o), o, Δ, and x shown in the column showing a store, are given points 2, 1, 0, and −10, respectively. For example, in the case when the distance in spectrum-based features is smaller than the corresponding threshold value, and the distance in pitch-based features exceeds the corresponding threshold value, a score o is given to the combination of the comparison results. In this manner, the score calculator 148 calculates a score of each block. A total decision making part 149 makes a decision based on the score of each block. For example, the total decision making part 149 sums the score of each block, and compares the total score with a predetermined threshold value. If the total score is equal to or larger than the predetermined threshold value, the total decision making part 149 makes a decision that an unknown speaker is a real speaker. If not, an unknown speaker is rejected. Alternatively, the total decision making part 149 may make a decision by checking whether or not a percentage of blocks having a score equal to or greater than 1, is 90% or over. If the discrimination result is affirmative, an unknown speaker is accepted.

Figure 36:
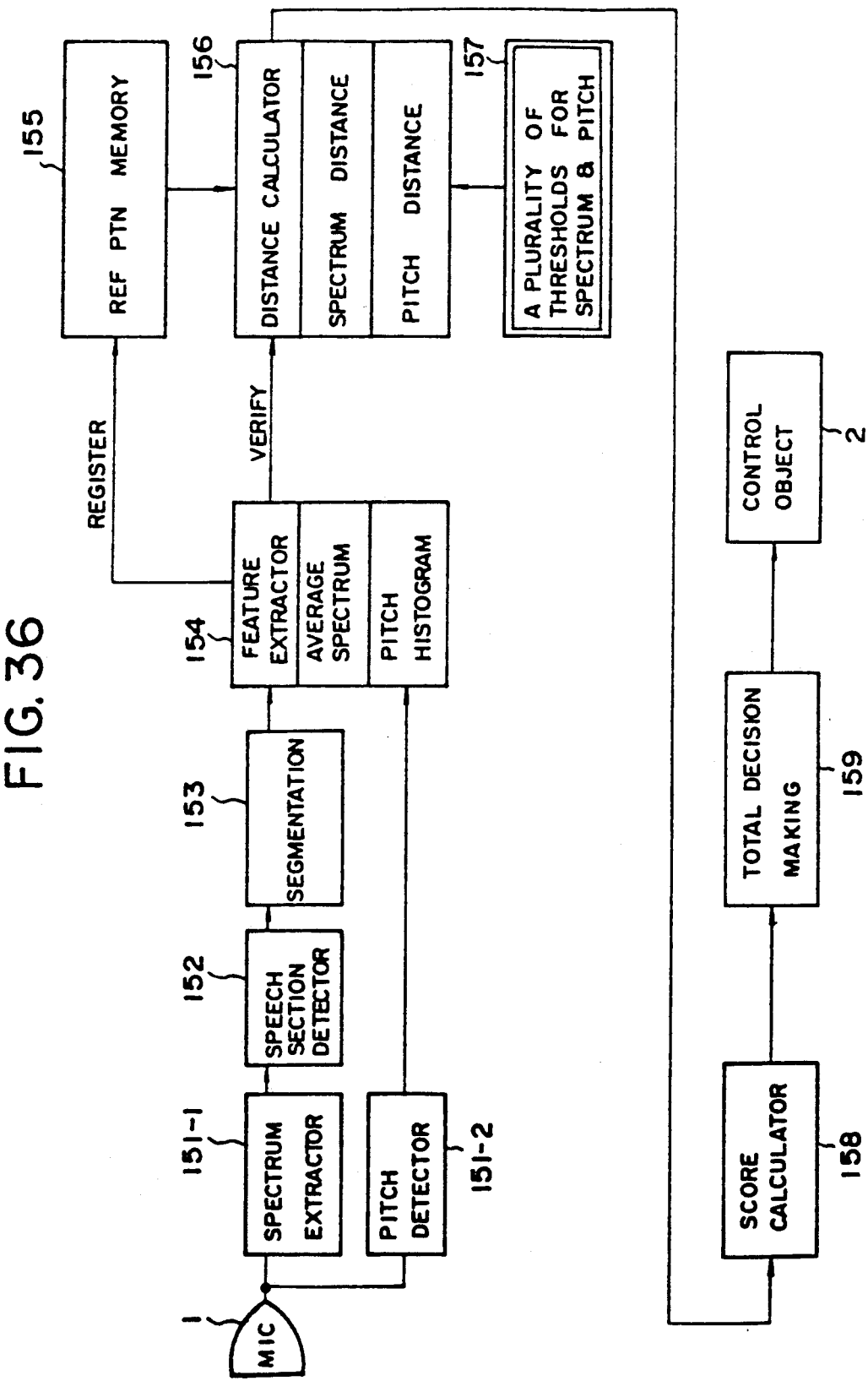
FIG.36 is a block diagram of a fourteenth embodiment of the present invention.

A description is given of the fourteenth embodiment of the present invention with reference to FIG.36. The embodiment of FIG.36 differs from the embodiment of FIG.34 in that for every block, a plurality of threshold values are provided for the spectrum-based distance and the pitch-based distance. It is noted that in the case where a single threshold value is provided for every block, the score is based on the threshold value. Therefore, it is probable that a speech pattern which fluctuates in the vicinity of the single threshold value, is erroneously recognized. From this viewpoint, the embodiment of FIG.36 is directed to give the score some degree of freedom by using a plurality of threshold values provided for the spectrum-based distance and the pitch-based distance.

An example is described in which two different threshold values are provided for each of the spectrum-based and the pitch-based distances. It is now assumed that a strict threshold value and a loose threshold value are set for each of the spectrum-based and pitch-based distances. For example, a mark (o) shown in columns about the spectrum and pitch of FIG.37 is given where both of the spectrum-based and pitch-based distances are smaller than the respective strict threshold values. A mark o is given where spectrum-based and pitch-based distances are lower than the respective loose threshold values. A mark x is given other cases. All the possible combinations of distance calculation results are shown in FIG.37. Scores (o), o, Δ, and x are given points 2, 1, 0, and −10, respectively.

A distance calculator 156 calculates the spectrum-based distance and the pitch-based distance. Then the calculated spectrum-based and pitch-based distances are compared with the two respective threshold values. If comparison results with respect to the spectrum and pitch period are o and (o), respectively, a score (o) is given to the combination of the above comparison results. A total decision making part 159 makes a decision as in the case of the total decision making part 149.

A description is given of the detail of the pitch detector 121-2, 141-2 or 151-2. As described previously, the verification rate can be enhanced by using pitch period information in addition to spectrum information. However, it is to be noted that generally, a complex calculation such as a calculation for calculating autocorrelation coefficients of speech is necessary to accurately detect pitch. Therefore, even when the aforementioned simplified segmentation of the present invention is employed, a large number of calculations are still necessary for the pitch detection. Hence it is impossible to effectively miniaturize speaker verification systems.

For example, a scheme for enhancing the accuracy in pitch detection has been proposed in a paper: L. R. Rabiner et at, "Digital Processing of Speech Signals", Prentice-Hall, 1987, pp.150-158. The paper discloses that before pitch detection, high-frequency components of a speech signal higher than the pitch frequencies thereof are eliminated by a lowpass filter having a predetermined cutoff frequency. It is preferable to set the cutoff frequency to frequencies around the pitch frequencies. It is to be noted that pitch frequencies vary all the time, and greatly depend on whether a speaker is a male or female. For these reasons, it is very difficult to select an optimum cutoff frequency; particularly, in a pitch detection scheme based on zero-crossing number, if an inappropriate cutoff frequency is set, a double pitch and a half pitch are erroneously detected.

Another pitch detection scheme has been disclosed in a paper, G. Koh, et al, "An Improved Autocorrelation Pitch Detector and Its Evaluation with Chinese", Lecture Paper of Acoust. Soc. Jpn., March 1985, pp.157-158. This scheme does not use lowpass filters. However, complex hardware is required for pitch detection.

Structure for a pitch detector applicable to the aforementioned embodiment is summarized as follows. A speech signal is filtered by a lowpass filter, and is then binary valued by using a plurality of threshold values. A time interval between transition points in a specific direction is measured. The time interval starts from a transition point at which the binary valued speech signal exceeds a threshold value, and ends at a transition point at which the binary valued speech signal exceeds the same threshold value again. One transition point is related to one threshold value. Since a plurality of threshold values are used described above, a plurality of different transition points are provided. Therefore, time intervals are measured for every threshold value. A pitch period or pitch frequency is estimated by using measured time intervals. Normally, the pitch period of the human voice ranges from 100 Hz to 250 Hz. Therefore, by setting the cutoff frequency to approximately 300 Hz, it becomes possible to obtain binary valued speech signals in which noise components of frequencies higher than those of possible pitch frequencies are eliminated. It is to be noted that the time interval between adjacent transition points in the specific direction reflects the original speech waveform with high fidelity.

Therefore, an appropriate range of time intervals to be measured is necessarily determined. Hence, according to pitch detectors used in the aforementioned embodiments, only the time intervals within a predetermined appropriate range are selected from among all the measured time intervals. Alternatively, the difference between the measured time intervals is calculated, and only the time intervals smaller than a predetermined value interval are selected. Then a value of the pitch period of the speech is determined based on an estimation procedure in which the average of the selected time intervals or the minimum time interval is determined as the pitch period of the speech.

The above-mentioned pitch detection procedure is not adversely affected by noise, and can detect the pitch with high accuracy. Further, the procedure is not based on repetitive calculations which require a large memory capacity. Therefore it is possible to detect the pitch period in real time and simplify the hardware structure.

A description is given of an example of a pitch detector used in the embodiments of the present invention with reference to FIGS. 38 and 39. An input speech signal from the microphone 1 (now shown in FIG.38) is supplied to a lowpass filter 161 having a cutoff frequency of about 300 Hz, which eliminates high-frequency components therefrom. An output signal of the lowpass filter 161 is supplied to a plurality of comparators $162_1, 162_2, \ldots, 162_n$, and are thereby binary valued by using respective different threshold values $TH_1, TH_2, \ldots, TH_n$. Half of comparators $161_1-162_n$ work on a positive side of a waveform of the signal from the lowpass filter 161 (an upper half group in FIG.38), and the remaining half work on a negative side of the waveform (a lower half group). Binary valued signals supplied to the positive-side comparators are changed to "1", when amplitude curvatures thereof cross the corresponding threshold values towards increased positive values. On the other hand, binary valued signals supplied to the negative-side comparators are changed to "1", when amplitude curvatures thereof cross the corresponding threshold values towards increased negative values.

Binary valued signals derived from the comparators $162_1-162_n$ are supplied to synchronization circuits $163_1-163_n$, respectively, and are synchronized with a reference clock generated by a clock generator 164. Synchronized binary signals from the synchronization circuits $163_1-163_n$ are supplied to counters $165_1-165_n$, respectively. The counters $165_1-165_n$ are cleared when the respective binary signals are changed from "0" to "1", and start counting the reference clock. Thereafter, when the binary signals are changed from "0" to "1", the counters $165_1-165_n$ stop counting. In this manner, the counter $165_1-165_n$ count respective time intervals between adjacent transition points of 0 to 1. Counted values in the counters $165_1-165_n$ are supplied to discrimination circuits $166_1-166_n$, which discern whether or not the respective counted values are in an appropriate range. Respective discrimination results are supplied to an estimation circuit 167. Normally, pitch periods of human voices are within a range of 100 Hz to 250 Hz. For a frequency of the reference clock of 16 kHz, appropriate counted values range from 64 to 160. Therefore, when the time intervals supplied from the counters $165_1-165_n$ are in the above-mentioned range, the discrimination circuits $166_1-166_n$ determine that the above time intervals are appropriate time intervals. Alternatively, the difference between the counted values may be calculated, and may be compared with a predetermined threshold value. When the difference is smaller than the threshold value, the above counted values are appropriate values. Criteria for the discrimination as to whether or not counted values are appropriate values are not limited to the above-mentioned criteria. Since an appropriate range of counted values can be estimated in advance, various criteria can be used.

The estimation circuit 167 uses the appropriate counted values out of the outputs of the discrimination circuits $166_1-166_n$, and estimates the pitch period or frequency of the input speech. Various algorithms for the estimation are conceivable. For example, the average of the counted values, or the minimum counted value is determined as the pitch period of the input speech.

FIG.39 shows waveforms of different signals at positions of the structure of FIG.38. FIG.39(a) shows a waveform of the reference clock, and FIG.39(b) shows a waveform of the output signal of the lowpass filter 161. FIG.39(c) shows a waveform of the binary signal derived from the positive-side comparator $165_i$, and FIG.39(d) shows a waveform of the above binary signal after the synchronization. FIG.39(e) shows a waveform of the binary signal derived from the negative-side comparator $165_j$, and FIG.39(f) shows a waveform of the above binary signal after the synchronization. The positive-side counter $165_i$ counts a time interval between X—X, and the negative-side counter $165_j$ counts time interval between Y—Y.

Figure 40:
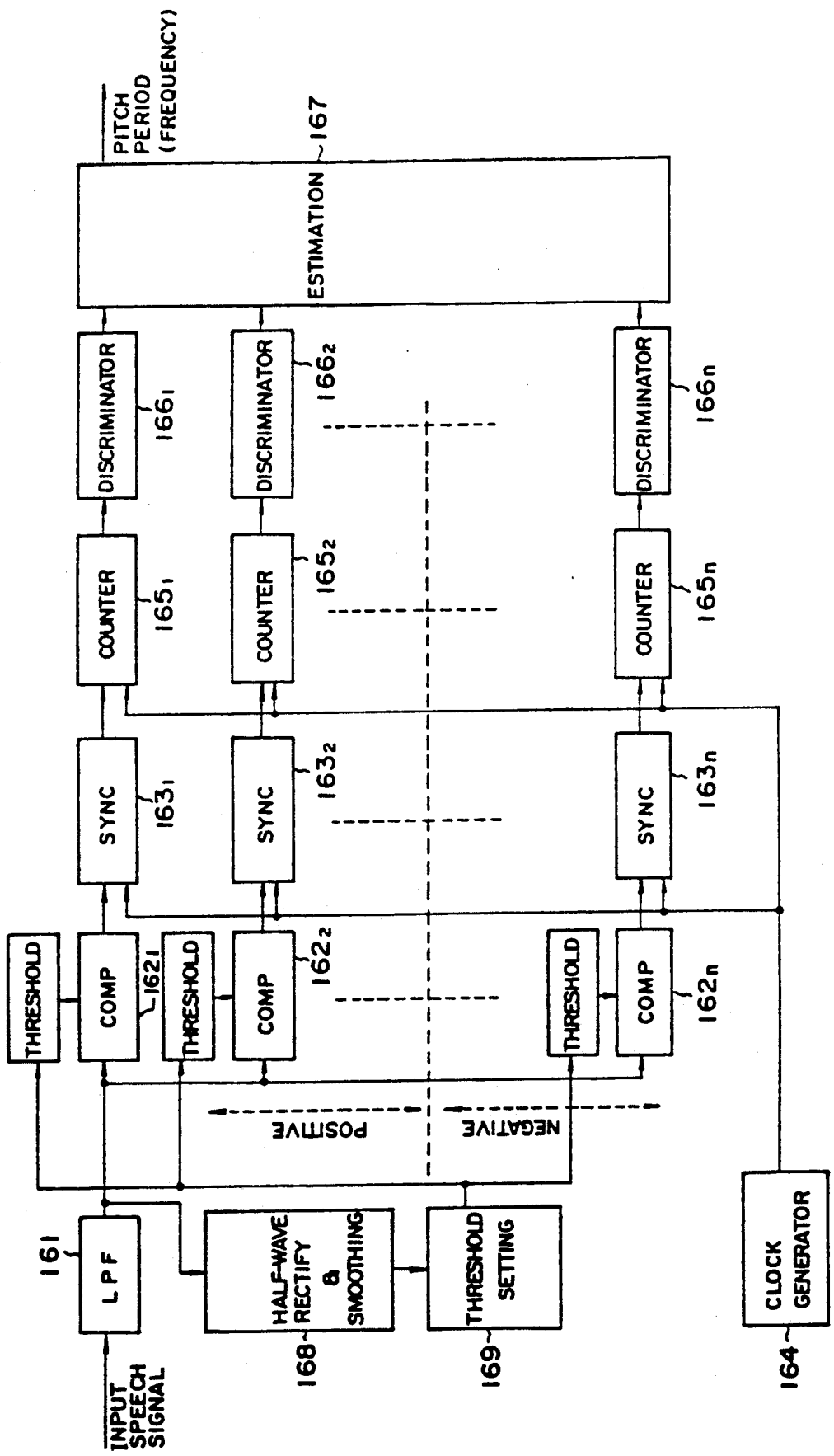
FIG.40 is a block diagram of another example of the pitch detector used in the embodiments of the present invention.

Another example of the pitch detector used in the embodiment of the present invention is described with reference to FIG.40. In FIG.40, those parts which are the same as parts shown in FIG.39 are given the same references. The embodiment of FIG.40 has an essential feature in which threshold values are adaptively adjusted depending on amplitudes of the input speech signal. The filtered input speech signal supplied from the lowpass filter 161 is rectified and then smoothed by a half-wave rectification/smoothing circuit 168. Therefore, effective values of positive and negative amplitudes of the speech signal are derived from the half-wave rectification/smoothing circuit 168. A threshold setting circuit 169 multiplies each of the positive and negative effective values predetermined times, which may be separately selected for every threshold value. The multiplied effective values of the positive amplitudes are supplied to the corresponding positive-side comparators $162_i$. Similarly, the multiplied effective values of the negative amplitudes are supplied to the corresponding negative-side comparators $162_j$. With the above-mentioned structure, it becomes possible to compensate errors occurring in the pitch detection arising from a time-varying amplitude of the input speech signal.

Figure 41:
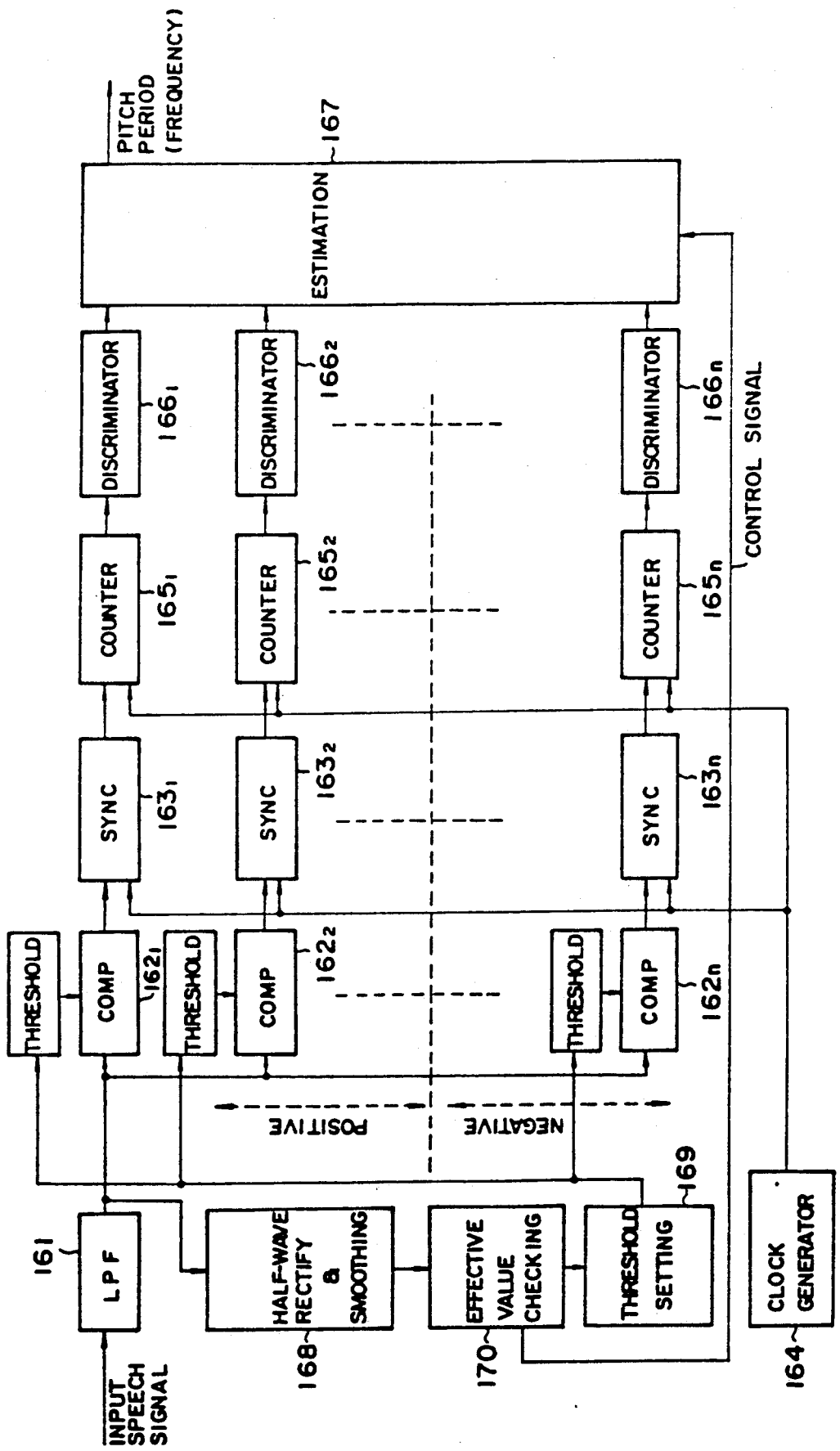
FIG.41 is a block diagram of still another example of the pitch detector used in the embodiments of the present invention.

A description is given of still another example of the pitch detector used in the embodiments of the present inventions with reference to FIG.41. In FIG.41, those parts which are the same as parts shown in FIG.40 are given the same references. The example of FIG.41 has an essential feature in which there is provided an effective value checking circuit 170 for checking whether or not effective values of positive and negative amplitudes are appropriate values. This is done by comparing the effective values with respective predetermined threshold values. When the effective value of positive or negative amplitudes becomes equal to or smaller than the corresponding threshold value, the effective value checking circuit 170 sends to the estimation circuit 167 a control signal which inhibits the estimation circuit from estimating the pitch period of the input speech signal.

In the aforementioned examples of the pitch detector, the discrimination circuits $166_1-166_n$ are provided with the counters $165_1-165_n$, respectively. Alternatively, it is possible to make the estimation algorithm of the estimation circuit 167 so as to include the algorithm for the discrimination implemented by the discrimination circuits $166_1$. The synchronization circuits $163_1-163_n$ are unnecessary in a case where the comparators $162_1-162_n$ can operate in synchronization with the reference clock.

A further example of the pitch detector used in the embodiments of the present invention is described with reference to FIG.42. A lowpass filter 201 has a variable cutoff frequency depending on values of an analog or digital control signal E. The lowpass filter 201 can be constituted by a voltage-controlled filter or a variable clock switched capacitor filter, for example. An input speech signal is filtered by the lowpass filter 201, and is then supplied to a pitch detection part 202, which corresponds to the circuit structures of FIGS.38, 40 and 41 except for the lowpass filter 161.

A cutoff frequency optimizing unit 203 dynamically optimizes the cutoff frequency of the lowpass filter 201, and includes power detectors 204 and 205, and a control circuit 206. The power detector 204 detects a short-term average power (A) of an input speech signal at an input terminal of the lowpass filter 201. The power detector 205 detects a short-term average power (B) of an output signal of the lowpass filter 201. The control circuit 206 generates the control signal E. When the average power ratio B/A is smaller than a target value C, the control signal E has the lowpass filter 201 decrease the cutoff frequency. On the other hand, when the average power ratio B/A is greater than the target value C, the control signal E has the lowpass filter 201 increase the cutoff frequency. In this manner, the cutoff frequency of the lowpass filter 201 is set to an optimum value. As a result, even if the pitch of the input speech signal varies successively, erroneous pitch detection can be prevented.

The above-mentioned pitch optimization is applicable to a pitch detection process based on the zero-crossing number or autocorrelation.

Figure 42:
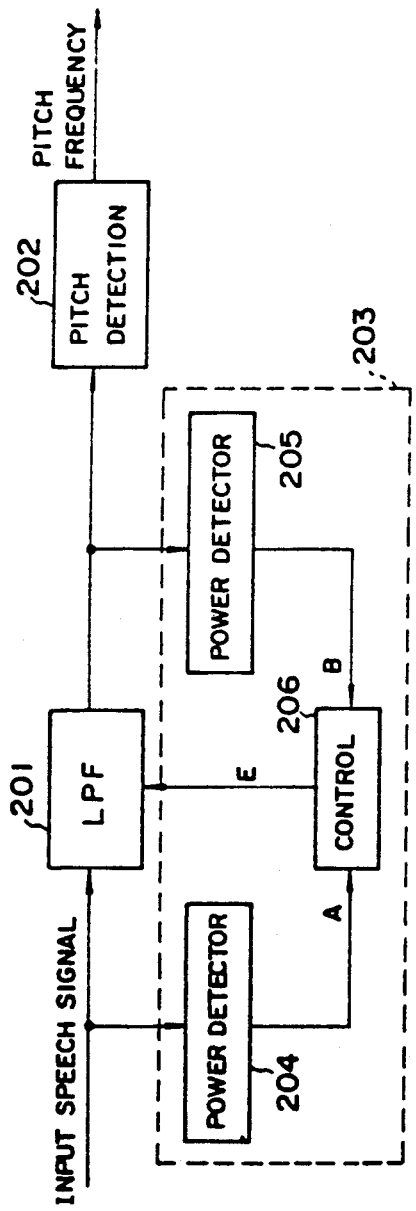
FIG.42 is a block diagram of a further example of the pitch detector used in the embodiments of the present invention.
Figure 43:
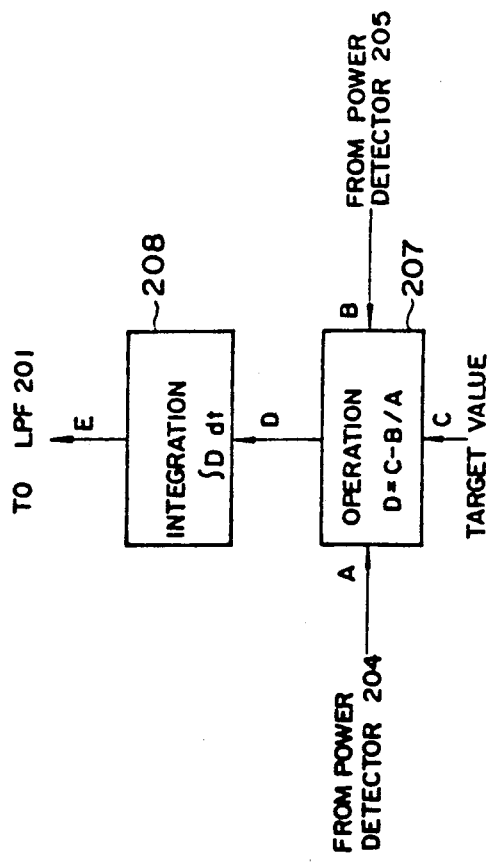
FIG.43 is a block diagram of an example of a control circuit 206 shown in FIG.42.

FIG.43 shows the detail of the control circuit 206 illustrated in FIG.42. An operation circuit 207 computes a difference D between the target value C and the short-term average power ratio B/A. An integration circuit 208 integrates the difference D. An output signal of the integration circuit 208 serves as the control signal E to be supplied to the lowpass filter 201 shown in FIG.42. As the value of the control signal increases, the cutoff signal of the lowpass filter 201 increases.

Figure 44:
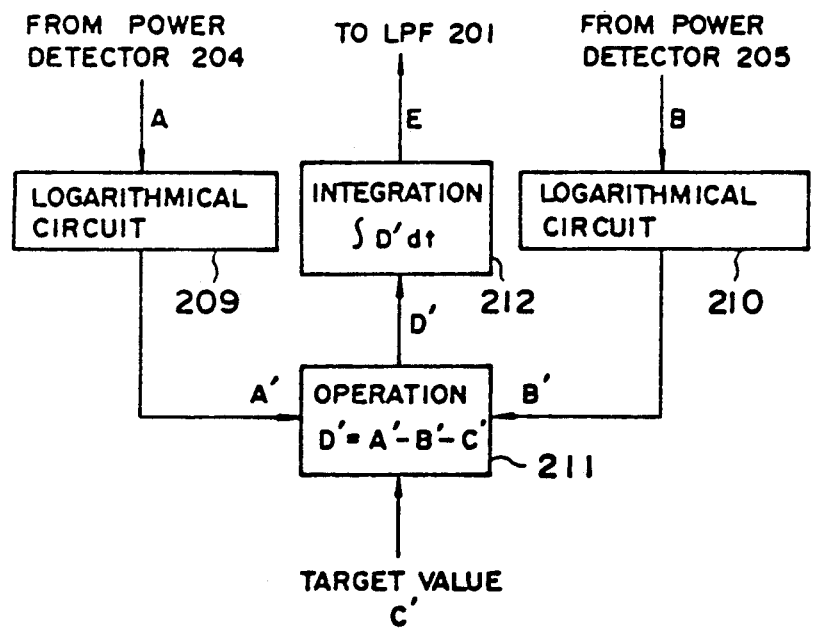
FIG. 44 is a block diagram of another example of the control circuit 206 shown in FIG.42.

FIG.44 shows another example of the control circuit 206. Referring to FIG.44, logarithm circuits 209 and 210 convert the short-term average powers A and B supplied from the power detectors 204 and 205 into logarithmical vlaues A' and B', respectively. An operation circuit 211 performs the following calculation:

$$D' = A' - B' - C' \qquad (21)$$

where C' is a logarithmical target value. The above value D' is supplied to an integration circuit 212, which produces a corresponding control signal E. That is, the segmentation performed in the circuit of FIG.43 is eliminated by using logarithmical values. The cutoff frequency increases with an increase of the value of the control signal E.

The present invention is not limited to the aforementioned embodiments, and variations and modifications may be made without departing from the scope of the present invention.

What is claimed is:

1. A speaker verification system, comprising:
    a) conversion means for:
        1) dividing an input speech signal into frames at predetermined time intervals; and
        2) converting the input speech signal into an acoustic parameter with a frequency spectrum having a plurality of frequency channels for every frame, thus generating a time-series of spectral patterns;
    b) detecting means for detecting, from the time-series of spectral patterns, a speech portion of the input speech signal;
    c) primary moment generating means for generating a primary moment of the frequency spectrum for every frame, the primary moment showing a channel position corresponding to a center of the frequency spectrum;
    d) segmentation means for segmenting the speech portion into a plurality of blocks, based on the primary moment generated for every frame;
    e) feature extracting means for extracting features of the input speech signal for every segmented block;
    f) memory means for storing reference features of registered speakers, the reference features including features of input speech signals of the registered speakers extracted by the feature extracting means;
    g) distance calculating means for calculating a distance between (1) the extracted features of an unknown speaker, and (2) the reference features stored in the memory means; and
    h) decision means for making a decision as to whether or not the unknown speaker is a real speaker by comparing the distance calculated by the distance calculating means with a predetermined threshold value.

2. The speaker verification system of claim 1, wherein:

the primary moment generated by the primary moment generating means includes a weighted component which emphasizes the spectrum in a predetermined frequency range of the frequency spectrum.

3. The speaker verification system of claim 1, wherein:

the speaker verification system further comprises reference block setting means for generating reference blocks based on the primary moment of the input speech signal obtained when the reference features of one of the registered speakers are registered in the memory means; and the segmentation means includes means to segment the speech portion of the input speech signal of the unknown speaker into the plurality of blocks in accordance with positions of the reference blocks.

4. The speaker verification system of claim 1, wherein:

the speaker verification system further comprises arithmetic average calculating means for calculating a time-base arithmetic average of primary moments of frame in each of an umber of reference blocks, the reference blocks being defined as the plurality of blocks of the input speech signal obtained when the reference features of one of the registered speakers are registered in the memory means; and the segmentation means includes means for segmenting the speech portion of the input speech signal of the unknown speaker into the plurality of blocks in accordance with a duration timer length control type transition model defining a relationship between (1) the time-base arithmetic average of the primary moments obtained for every reference block, and (2) the primary moments in the speech portion of the input speech signal of the unknown speaker.

5. The speaker verification system of claim 1, wherein:

the segmentation means includes means for segmenting into blocks, speech portions of input speech signals of one of the registered speakers which were uttered a predetermined number of times, the segmenting carried out when the reference features of the one of the registered speakers are registered in the memory means, thus obtaining a plurality of blocks for each of the input speech signals;

the speaker verification system further comprises reference block setting means for specifying reference blocks which are a typical number of blocks out of the plurality of blocks obtained for each of the input speech signals; and the segmentation means includes means for segmenting the speak section of the unknown speaker into a number of blocks equal to the typical number of blocks specified by the reference block setting means.

6. The speaker verification system of claim 1, wherein:

the segmentation means includes means to segment speech portions of each of a predetermined number of input speech signals of one of the registered speakers when the reference features of the one of the registered speakers are registered in the memory means, thus obtaining a plurality of blocks for each of the predetermined number of input speech signals;

the speaker verification system further comprises:

a) reference block setting means for specifying reference blocks which are a typical number of blocks out of the plurality of blocks obtained for each of the input speech signals; and b) arithmetic average calculating means for calculating a time-base arithmetic average of primary moments of frames in each of the reference blocks; and the segmentation means includes means for segmenting the speech portion of the input speech signal of the unknown speaker into the plurality of blocks in accordance with a duration time length control type transition model defining a relationship between (1) the time-base arithmetic average of the primary moments obtained for every reference block, and (2) the primary moments in the speech portion of the input speech signal of the unknown speaker.

7. The speaker verification system of claim 1, wherein:

the segmentation means includes means to segment speech portions of each of a predetermined number of input speech signals of one of the registered speakers when the reference features of the one of the registered speakers are registered in the memory means, thus obtaining a plurality of blocks for each of the predetermined number of input speech signals;

the speaker verification system further comprises:

a) reference block setting means for specifying reference blocks from among the blocks of the predetermined number of input speech signals in accordance with a predetermined criterion; and b) re-segmentation means for re-segmenting the speech portion of each of the predetermined number of input speech signals into a plurality of re-segmented blocks in accordance with the reference blocks, thus obtaining reference features of the one of the registered speakers for the re-segmented blocks of each of the predetermined number of input speech signals;

the segmentation means includes means to segment the speech portion of the unknown speaker into the plurality of blocks on the basis of the reference blocks; and the distance calculating means includes means for calculating the distance between (1) the extracted features of the unknown speaker obtained for every reference block, and (2) the reference features of the one of the registered speakers which are obtained for the re-segmented blocks of each of the predetermined number of input speech signals.

8. The speaker verification system of claim 7, wherein:

the reference blocks setting means includes means to specify, of the reference blocks, a minimum number of blocks included in the speech portion of one of the predetermined number of input speech signals.

9. The speaker verification system of claim 7, wherein:

the speaker verification system further comprises arithmetic average calculating means for calculating a time-base arithmetic average of primary moments of frames in each of the reference blocks; and the segmentation means includes means for segmenting the speech portion of the input speech signal of the unknown speaker into the plurality of blocks in accordance with a duration time length control type transition model defining a relationship between (1) the time-base arithmetic average of the primary moments obtained for every reference block, and (2) the primary moments in the speech portion of the input speech signal of the unknown speaker.

10. The speaker verification system of claim 9, further comprising:

means for describing the features, which the feature extracting means extracts for every block, by using an average spectrum obtained by calculating an arithmetic average of the spectrum of each frame within each block, and a gradient of a least square fit line with respect to the average spectrum within each frame.

11. The speaker verification system of claim 9, further comprising:

means for describing the features which the feature extracting means extracts for every block, as spectral data obtained by:
1) calculating an arithmetic average of the spectrum of each frame over each block;
2) calculating a gradient of a least square fit line with respect to the average spectrum within each frame; and
3) subtracting the arithmetic average obtained for every block from the gradient obtained for every block.

12. The speaker verification system of claim 9, further comprising:

means for describing the features which the feature extracting means extracts for every block, as spectral data obtained by calculating a least square fit line with respect to a general shape of the spectrum of each frame, and subtracting the least square fit line from the general shape.

* * * * *